(12) United States Patent
Furui

(10) Patent No.: US 8,866,902 B2
(45) Date of Patent: Oct. 21, 2014

(54) CORRECTION INFORMATION CALCULATING DEVICE, IMAGE PROCESSING APPARATUS, IMAGE DISPLAY SYSTEM, AND IMAGE CORRECTING METHOD

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 507 days.

(21) Appl. No.: 13/021,986

(22) Filed: Feb. 7, 2011

(65) Prior Publication Data

US 2011/0211065 A1 Sep. 1, 2011

(30) Foreign Application Priority Data

Feb. 26, 2010 (JP) ................................. 2010-042463

(51) Int. Cl.
 *H04N 7/18* (2006.01)
 *H04N 9/31* (2006.01)
 *G03B 21/14* (2006.01)
(52) U.S. Cl.
 CPC .............. *G03B 21/14* (2013.01); *H04N 9/3185* (2013.01); *H04N 9/3197* (2013.01); *H04N 9/3147* (2013.01)
 USPC ......................................................... 348/135
(58) Field of Classification Search
 CPC ...................................................... H04N 7/18
 USPC ......................................................... 348/135
 See application file for complete search history.

(56) References Cited

U.S. PATENT DOCUMENTS

| 7,237,911 | B2 * | 7/2007 | Yamada | 353/121 |
|---|---|---|---|---|
| 7,341,188 | B2 * | 3/2008 | Aiki et al. | 235/454 |
| 7,385,737 | B2 * | 6/2008 | Zaima | 358/504 |
| 2002/0024640 | A1 * | 2/2002 | Ioka | 353/94 |
| 2007/0098300 | A1 * | 5/2007 | Komiya et al. | 382/284 |
| 2007/0222792 | A1 * | 9/2007 | Matsuda | 345/604 |
| 2007/0274588 | A1 * | 11/2007 | Jeong et al. | 382/181 |
| 2007/0291047 | A1 * | 12/2007 | Harville et al. | 345/589 |
| 2007/0291189 | A1 * | 12/2007 | Harville | 349/7 |
| 2007/0291233 | A1 * | 12/2007 | Culbertson et al. | 353/34 |
| 2010/0171930 | A1 * | 7/2010 | Kurosawa | 353/30 |
| 2010/0265403 | A1 * | 10/2010 | Hikosaka | 348/607 |
| 2010/0277655 | A1 * | 11/2010 | Sun | 348/744 |
| 2010/0315601 | A1 * | 12/2010 | Furui | 353/70 |
| 2011/0025982 | A1 * | 2/2011 | Takahashi | 353/15 |

FOREIGN PATENT DOCUMENTS

| JP | A-6-141246 | 5/1994 |
|---|---|---|
| JP | A-2002-72359 | 3/2002 |
| JP | A-2005-39849 | 2/2005 |
| JP | A-2009-21771 | 1/2009 |

* cited by examiner

*Primary Examiner* — Richard Torrente
*Assistant Examiner* — Irfan Habib
(74) *Attorney, Agent, or Firm* — Oliff PLC

(57) ABSTRACT

A correction information calculating device calculates correction information representing correspondence relationship between a position of a pixel in an image projected onto a projection surface by projectors including an image forming element and a position of a pixel of the image forming element. The correction information calculating device includes a supply unit that supplies first and second measurement image data representing a first and second measurement pattern including a plurality of characteristic diagrams that define characteristic points to a first and second projector that projects an image onto a first and second projection area on the projection surface and a calculation unit that calculates the correction information by comparing positions of the plurality of characteristic points in a photographed pattern acquired by photographing the first and second measurement patterns.

13 Claims, 9 Drawing Sheets

CORRECTION INFORMATION CALCULATING DEVICE, IMAGE PROCESSING APPARATUS, IMAGE DISPLAY SYSTEM, AND IMAGE CORRECTING METHOD

BACKGROUND

1. Technical Field

The present invention relates to a correction information calculating device, an image processing apparatus, an image display system, and an image correcting method.

2. Related Art

Generally, as one example of an image display device, a projector is known. Projectors have advantages such as ease of installation and the ability to display of a big screen image. Recently, image display systems displaying one image by using a plurality of projectors have been proposed (for example, see JP-A-2002-72359).

In the image display system disclosed in JP-A-2002-72359, partial images are projected by a plurality of projectors, and one image is displayed as a whole of a plurality of the partial images. By overlapping the edge portions of the partial images adjacent to each other, it is difficult to recognize the joining portions of the partial images. In addition, the geometrical deformation of the partial images on the projection surface is corrected. Accordingly, image distortion is reduced.

According to the image display system disclosed in JP-A-2002-72359, in order to perform geometrical correction of the partial images, the following process is performed. First, a test image including a marker is displayed, and the displayed test image is photographed. Then, correction information representing the correction amount of pixel positions is acquired for each projector based on the correspondence relationship between the position of a marker on image data representing the test image and the position of a marker within a photographed image acquired by photographing the test image. In a case where an image for a viewer (hereinafter, referred to as a content image) is displayed, the image data representing the content image is corrected based on the correction information, and partial images are displayed based on the image data after correction.

In the technology disclosed in JP-A-2002-72359, there is room for improvement for the effort and the time until the correction information is acquired. More specifically, according to the technology disclosed in JP-A-2002-72359, when test images are simultaneously projected from a plurality of projectors, in test images adjacent to each other, markers thereof may overlap each other. In such a case, it is difficult to detect the positions of the markers overlapping each other with high precision. Accordingly, it is difficult to acquire the correction information with high precision.

In order to resolve such disadvantages, for example, a method in which test images are projected by shifting projection timings of the plurality of projectors from one another, and the test image of each projector is individually photographed may be considered. In this method, there is a disadvantage in that the effort and time needed for projecting and photographing the test images increases as the number of the projectors is increased. In addition, there is a case where a photographing device is moved from the previous photographing operation to a next photographing operation. When the photographing device is moved, an error may occur in the position of the marker included in the photographed image. Then, the correction information is calculated under a condition in which the positions of the plurality of partial images are deviated from one another. Distortion or a positional difference occurs in the partial images projected based on the image data that is corrected based on the above-described correction information.

SUMMARY

An advantage of some aspects of the invention is that it provides a correction information calculating device, an image processing apparatus, an image display system, and an image processing method capable of efficiently acquiring correction information used for correcting image distortion in each partial image forming a part of a content image or a difference in the relative positions of a plurality of partial images.

According to an aspect of the invention, there is provided a correction information calculating device that calculates correction information representing correspondence relationship between a position of a pixel in an image projected onto a projection surface by projectors including an image forming element and a position of a pixel of the image forming element. The correction information calculating device includes: a supply unit that supplies first measurement image data representing a first measurement pattern including a plurality of characteristic diagrams that define characteristic points to a first projector that projects an image onto a first projection area on the projection surface and supplies second measurement image data representing a second measurement pattern including a plurality of characteristic diagrams that define characteristic points to a second projector that projects an image onto a second projection area including an overlapping area overlapping the first projection area; and a calculation unit that calculates the correction information by comparing positions of the plurality of characteristic points in a photographed pattern acquired by photographing the first and second measurement patterns projected onto a projection surface by the first and second projectors based on the first and second measurement image data and positions of the plurality of characteristic points defined in the first and second measurement image data. When an arrangement direction of pixels of the first and second measurement patterns corresponding to an alignment direction of the first projection area and the second projection area is set as a first arrangement direction, and a direction intersecting the first arrangement direction is set as a second arrangement direction, the first and second measurement patterns include characteristic diagram columns configured by two or more of the characteristic diagrams arranged on the end located on a side overlapping another measurement pattern in the first arrangement direction out of the plurality of characteristic diagrams, and positions of the characteristic diagrams belonging to the characteristic diagram column defined in the first measurement image data are different from positions of the characteristic diagrams belonging to the characteristic diagram column defined in the second measurement image data.

In the above-described correction information calculating device, as described above, the positions of the characteristic points belonging to the characteristic point row in the second arrangement direction are different in the first measurement image data and the second measurement image data. Accordingly, the positions of the characteristic points may be easily misaligned in the direction intersecting the direction in which the first projection area and the second projection area are aligned in accordance with the measurement pattern projected by the first projector and the measurement pattern projected by the second projector. Therefore, even when the measurement patterns are projected in parallel by the first projector and the second projector, it can be avoided that the characteristic points overlap with each other on the projection surface. In other words, by projecting the measurement patterns in parallel by using a plurality of projectors, the positions of the projected characteristic points can be detected with high precision. As above, according to the above-described correction information calculating device, the correction information representing correspondence relationship between the position of a pixel on the projection surface and the position of a pixel defined in the image data can be efficiently acquired.

In the above-described correction information calculating device, it may be configured that arrangement of the plurality of characteristic diagrams in the first measurement pattern is the same as arrangement of the plurality of characteristic diagrams in the second measurement pattern, the measurement pattern includes a first characteristic diagram column arranged on one end in the first arrangement direction and a second characteristic diagram column arranged on the other end, and positions of the characteristic diagrams belonging to the first characteristic diagram column in the second arrangement direction are different from positions of the characteristic diagrams belonging to the second characteristic diagram column in the second arrangement direction.

In such a case, in the first measurement image data and the second measurement image data, overlapping between the characteristic points on the projection surface can be avoided while arranging the plurality of characteristic points in a same manner. Accordingly, the effort required for generating measurement image data or the like can be reduced, and the effort required for detecting the characteristic points from the projected measurement pattern can be reduced.

According to another aspect of the invention, there is provide am image processing apparatus including: the above-described correction information calculating device; and an image correction unit that corrects image data such that an image projected onto a projection surface by a projector based on the image data after correction approximately coincides with an image represented by the image data before correction by referring to the correction information calculated by the correction information calculating device.

According to the above-described image processing apparatus, the correction information can be efficiently acquired. Thus, the above-described image processing apparatus can correct the distortion of partial images and a difference between relative positions of the partial images while eliminating the effort for acquiring the correction information.

According to still another aspect of the invention, there is provided an image display system including: the above-described image processing apparatus; and a plurality of projectors that projects images based on the image data after correction that is corrected by the image processing apparatus.

According to the above-described image processing apparatus, the distortion of partial images and a difference in the relative positions of the partial image can be corrected with high precision while eliminating the effort for acquiring the correction information. Therefore, the above-described image display system provides convenience and can display a high-quality image.

The above-described image display system may further includes: a photographing device that photographs an area including the first projection area and the second projection area onto which the measurement pattern is projected, wherein the correction information calculating device calculates the correction information by using a photographed pattern out of photographed images photographed by the photographing device.

In such a case, the number of photographing operations can be decreased, compared to a case where the first projection area and the second projection area are independently photographed, and accordingly, the correction information can be efficiently acquired. In addition, there is low probability that a difference in the positions of the photographing device occurs between photographing operations, and accordingly, an error in the positions of the characteristic diagrams due to mismatch of the position of the photographing device can be decreased.

According to yet another aspect of the invention, there is provided an image processing method including: supplying first measurement image data representing a first measurement pattern including a plurality of characteristic diagrams that define characteristic points to a first projector that projects an image onto a first projection area on a projection surface and supplies second measurement image data representing a second measurement pattern including a plurality of characteristic diagrams that define characteristic points to a second projector that projects an image onto a second projection area including an overlapping area overlapping the first projection area; calculating correction information representing correspondence relationship between positions of the plurality of characteristic positions in an photographed pattern acquired by photographing the measurement pattern projected onto the projection surface by the projectors based on the measurement image data and positions of the plurality of characteristic points defined in the measurement image data; and correcting the image data such that an image projected onto the projection surface by the projectors based on the image data after correction approximately coincides with an image represented by the image data before correction by referring to the correction information. When an arrangement direction of pixels of the measurement patterns corresponding to an alignment direction of the first projection area and the second projection area is set as a first arrangement direction, and a direction intersecting the first arrangement direction is set as a second arrangement direction, the measurement patterns include characteristic diagram columns configured by two or more of the characteristic diagrams arranged on the end located on a side overlapping another measurement pattern in the first arrangement direction out of the plurality of characteristic diagrams, and positions of the characteristic diagrams belonging to the characteristic diagram column defined in the first measurement image data are different from positions of the characteristic diagrams belonging to the characteristic diagram column defined in the second measurement image data.

According to the above-described image processing method, the correction information used for correcting the distortion of partial image and a difference in the relative positions of a plurality of the partial images with high precision can be efficiently acquired. Accordingly, the distortion of the partial images and a difference in the relative positions of the partial images can be corrected with high precision while eliminating the effort for acquiring the correction information.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
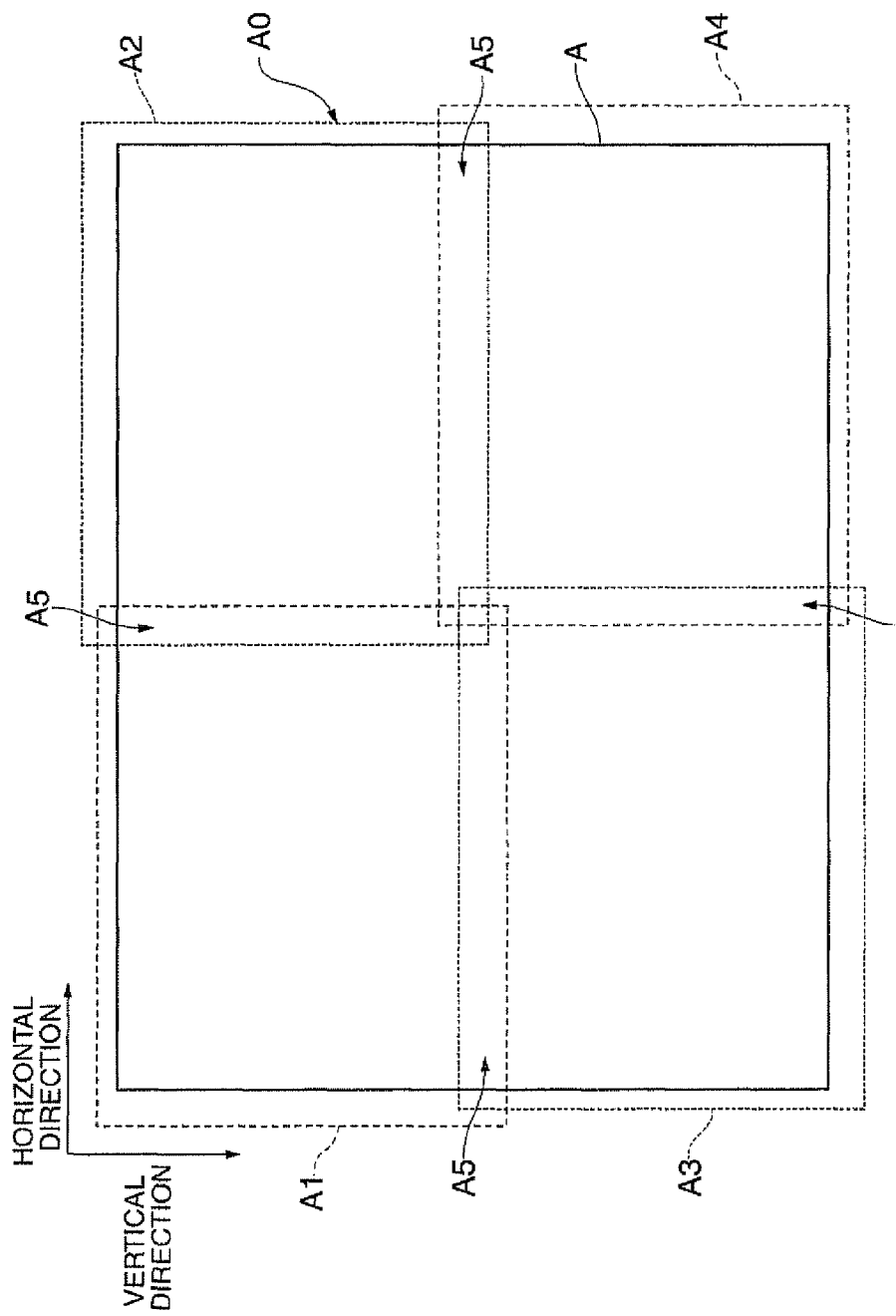
FIG. 1 is a schematic diagram showing an image display system according to an embodiment of the invention.

Hereinafter, embodiments of the invention will be described with reference to the accompanying drawings. In the drawings referred to, in order to represent characteristic parts to be easily understood, the size and the scale of a structure may be differently shown in the figures. In addition, to the same constituent elements, the same reference numeral is assigned, and detailed description thereof may be omitted.

Figure 2:
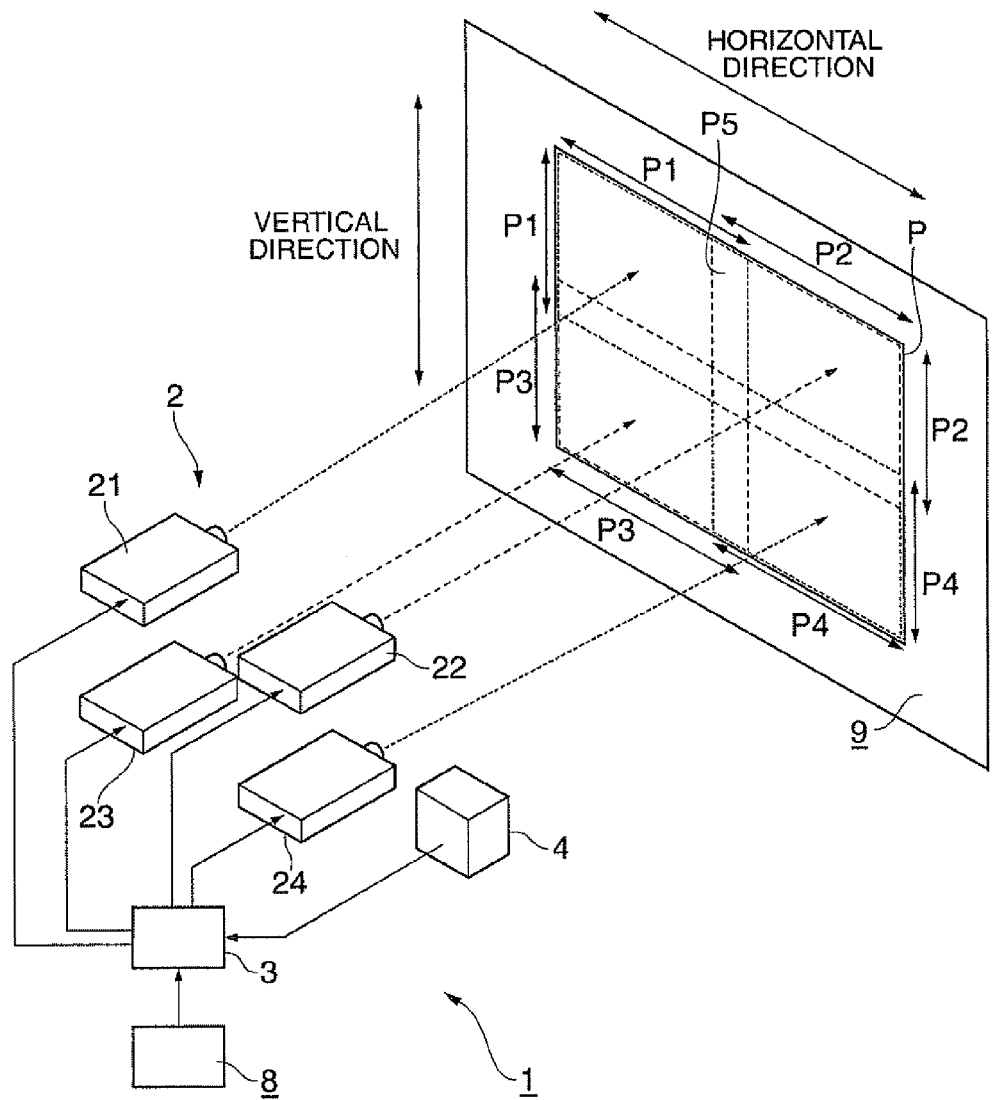
FIG. 2 is an explanatory diagram showing the positional relationship of a projection area on a projection surface.

FIG. 1 is a conceptual diagram of an image display system according to an embodiment of the invention. FIG. 2 is an explanatory diagram showing the relationship between an image projected onto a projection surface and a projection area.

As shown in FIG. 1, the image display system 1 includes a plurality of projectors 2, an image processing apparatus 3, and a photographing device 4. The image display system 1 projects a content image P, for example, represented by image data input from a signal source 8 onto a projection surface 9 such as a screen or a wall by using a plurality of projectors 2 in a sharing manner. Here, it is assumed that a first projector 21, a second projector 22, a third projector 23, and a fourth projector 24 are provided as the plurality of projectors 2. Here, the number or the arrangement of the projectors is not particularly limited as long as a plurality of the projectors is used. In the description presented below, an image projected by each of the plurality of projectors may be referred to as a "partial image". In addition, in the description presented below, image data representing the partial image may be referred to as "partial image data".

The projector 2 can display an image (here, a partial image) based on supplied image data (here, partial image data).

The configuration of the projector 2 is not particularly limited. For example, the projector 2 may be a single plate-type projector or a projector such as a three plate-type projector that includes a plurality of image forming devices. In addition, the projector 2 may be a front projection-type that projects an image onto the projection surface 9 from the viewer side or a rear projection-type that projects an image from a side opposite to the viewer with the projection surface 9 interposed therebetween.

Each of the plurality of projectors 2 according to this embodiment includes a light source, an image forming device, and a projection optical system. The image forming device has a plurality of pixels that is two-dimensionally arranged. Examples of the image forming device include a transmission-type or reflection-type liquid crystal light valve and a digital mirror device (DMD).

In each projector, light emitted from the light source is incident to the image forming device. The image forming device independently controls the plurality of pixels based on data for each pixel (hereinafter, referred to as pixel data) out of the partial image data that is input to the projector. The light incident to the pixel is modulated for each pixel so as to be light having light intensity defined by the pixel data. The light modulated by the plurality of pixels forms an optical image (image) as a whole, and this optical image is projected onto the projection surface 9 by the projection optical system. Here, in the plurality of projectors, the number of image forming devices and the arrangement of the pixels are the same.

The projection area that is an area in which each projector can project an image onto the projection surface 9 is set differently for the plurality of the projectors 2. As shown in FIG. 2, the first to fourth projection areas A1 to A4 are set such that edge portions thereof overlap one another and form a total projection area as a whole. In other words, each of the first to fourth areas A1 and A4 includes an overlapping area P5 that overlaps another projection area that is adjacent thereto.

The projection area (the first projection area A1) of the first projector 21 is aligned with the projection area (the second projection area A2) of the second projector 22 in the horizontal direction on the projection surface 9. In this horizontal direction, the end portion of the first projection area A1 overlaps the end portion of the second projection area A2. The positional relationship between the projection area (the third projection area A3) of the third projector 23 and the projection area (the fourth projection area A4) of the fourth projector 24 in the horizontal direction is similar to that between the first and second projection areas A1 and A2 in the horizontal direction.

The first projection area A1 is aligned with the third projection area A3 in the vertical direction that is perpendicular to the horizontal direction on the projection surface 9. In this vertical direction, the end portion (the edge portion) of the first projection area A1 overlaps the end portion (the edge portion) of the third projection area A3. The positional relationship between the second projection area A2 and the fourth projection area A4 in the vertical direction is similar to that between the first and third projection areas A1 and A3 in the vertical direction.

However, generally, the outer shape of the total projection area A0 is not formed in a rectangular shape. The reason for this is that there is distortion or a difference in the relative positions of the first to fourth projection areas A1 to A4 due to arrangement of the first to fourth projectors 21 to 24. Here, an approximately rectangular area fitted in the total projection area A0 is set as the area (an effective projection area A) that is used for actual projection of an image. The first to fourth projectors 21 to 24 project the partial images in an area of the projection areas that is fitted in the effective projection area A.

For example, a first partial image P1 is displayed in an area of the first projection area A1 that is fitted in the effective projection area A in accordance with light projected from the first projector 21. Similarly, second to fourth partial images P2 to P4 are displayed by the second to fourth projectors 22 to 24. The first to fourth partial images P1 to P4 are displayed onto the projection surface 9 with end portions thereof overlapping each other and configure the content image P as a whole.

Referring back to FIG. 1, the image processing apparatus 3 receives image data representing the content image P, for example, from the signal source 8. The image processing apparatus 3 performs various processes (to be described later) for the image data and generates a plurality of the partial image data based on the image data. Each partial image data is data representing any one of the first to fourth partial images P1 to P4. The image processing apparatus 3 supplies the partial image data representing the partial image of each projector to the first to fourth projectors 21 to 24. The first to fourth projectors 21 to 24 projects the first to fourth partial images P1 to P4 on the projection surface 9 based on the partial image data input from the image processing apparatus 3.

The image processing apparatus 3 performs a process (hereinafter, referred to as a position correcting process) of correcting the image distortion of each of the first to fourth partial images P1 to P4 and differences of the relative positions of the first to fourth partial images P1 to P4, as one of the above-described various processes. The image processing apparatus 3 calculates correction information that is used for the position correcting process at appropriately selected timing such as at the time of installation of the image display system 1 or at the time of maintenance when a predetermined period elapses from the time of installation of the image display system 1.

As one example of the image distortion, for example, there is image distortion (for example, keystone distortion) that occurs in accordance with an elevation angle or a depression angle in each projection direction of the first to fourth projectors 21 to 24 with respect to the projection surface 9, that is, the vertical direction, a swing angle in the horizontal direction, or the like. As another example of the image distortion, there is image distortion that occurs due to local distortion of the projection surface 9, for example, caused by deflection or the like of a cloth-shaped screen. The differences in the relative positions of the first to fourth partial images P1 to P4 are, for example, due to discordance of the projection directions, misalignment of the relative positions, or the like of the first to fourth projectors 21 to 24.

The image processing apparatus according to the embodiment of the invention can have various forms such as the following first to third forms.

As an image processing apparatus of the first form, a configuration that is configured by one or more logic circuits such as an ASIC that performs various processes may be used. A part of the whole of the image processing apparatus of the first form may be integrated with any of the first to fourth projectors 21 to 24, the photographing device 4, and the signal source 8.

As an image processing apparatus of the second form, a configuration of a computer in which a program is installed may be used. In other words, by allowing a computer to perform various processes in accordance with a program, the function of the image processing apparatus 3 can be realized. For example, by performing the operation of each process using a memory and a CPU in a cooperative manner, storing the result of the operation in a memory unit such as a hard disk or a memory, and reading out the result of the operation and providing the result to another process as necessary, the result of the process as in a case where a logic circuit or the like is used can be acquired. In addition, in the image processing apparatus 3 of the second form, various processes may be performed by a plurality of computers in a sharing manner.

As an image processing apparatus of the third form, a configuration in which a logic circuit performing a part of the various processes and a computer performing the other parts of the various processes in accordance with a program are combined may be used.

In this manner, an image processing apparatus according to an embodiment of the invention may also have a form as a set of a plurality of functional units each performing a part of various processes, other than the form of an independent device performing various processes. In other words, a form in which a plurality of functional units is divided into a plurality of separate devices, and the functional units perform the processes in a cooperative manner may be used.

The photographing device 4 of this embodiment can photograph an area on the projection surface 9 including the entirety of the total projection area A0. The photographing device 4, for example, is configured by a two-dimensional image sensor such as a CCD camera. The two-dimensional image sensor has a structure in which a plurality of light receiving elements formed from photo diodes or the like is two-dimensionally arranged. When the correction information is calculated, photographed image data representing a photographed image that is photographed by the photographing device 4 is output to the image processing apparatus 3.

When a content image P is displayed by a plurality of projectors 2 as above, the content image P can be displayed with high resolution and high luminance on a big screen. For example, compared to a case where a content image is displayed by one projector, under a condition that the number of pixels near the projector is the same, the content image P can be displayed on a big screen without decreasing the resolution. On the other hand, when compared under a condition that a content image P is displayed with the same screen size, the number of pixels can be increased in accordance with the number of the projectors, whereby the content image can be displayed with high resolution. In addition, when compared under a condition that the intensity of output light near the projector is the same, the intensity of light contributing to display can be increased in accordance with the number of the projectors, whereby the content image P can be displayed with high luminance.

When compared to a technique of increasing the number of pixels or the output level of the projector for acquiring the above-described advantages, the cost of each projector can be dramatically reduced. Accordingly, a decrease in the cost of the device can be expected even when the number of projectors is increased. In addition, it is possible that the projectors are installed and used at different places (for example, conference rooms) for an ordinary use, and an image display system is built, for example, at a main conference room in accordance with the use so as to display a content image with high resolution and high luminance on a big screen. As above, whether the projectors are individually used or a plurality of the projectors is used in a combined manner can be selected in accordance with the use. Accordingly, compared to a case where the above-described advantages are to be acquired by using one projector, the convenience is improved.

In addition, since the content image P is displayed based on the image data for which the position correcting process has been performed by the image processing apparatus 3, image distortion of each partial image and a difference in the relative positions of a plurality of the partial images are decreased. Thus, since the content image P can be display in a state in which image distortion is small, and it is difficult to recognize the joining portions of the partial images, the content image P can be displayed as an image having high quality. According to the embodiment of the invention, the image distortion of the partial image and the difference between relative positions can be corrected with high precision, and correction information can be efficiently calculated. Therefore, the effort and time required for installation, for example, of an image display system can be decreased, whereby the convenience of the image display system can be improved.

Figure 3:
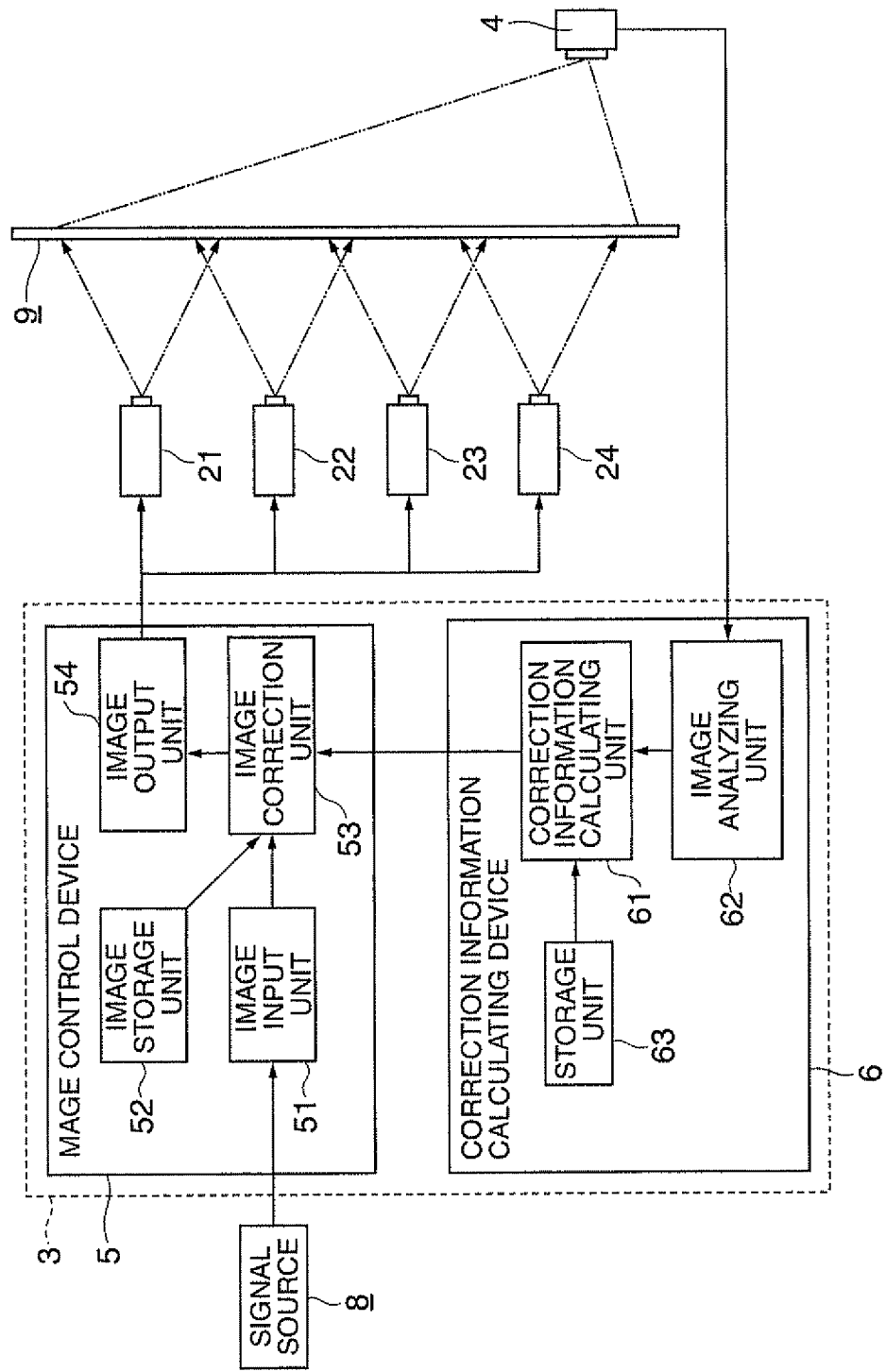
FIG. 3 is a diagram showing the configuration of the image display system.

Next, the constituent elements of an image processing apparatus 3 according to an embodiment of the invention will be described in detail with reference to FIG. 3. FIG. 3 is a diagram showing the functional configuration of the image processing apparatus 3.

As shown in FIG. 3, the image processing apparatus includes an image control device 5 and a correction information calculating device 6. The correction information calculating device 6 mainly calculates the correction information. The image control device 5 performs various processes and performs a position correcting process for the image data by using the correction information, as one of the various processes. According to this embodiment, the image control device 5 is configured as a part of a first computer, and the correction information calculating device 6 is configured by using a CPU, a memory unit, and the like of a second computer that is configured to be separately from the first computer.

The image control device 5 includes an image input unit 51, an image storage unit 52, an image correction unit 53, and an image output unit 54. The image input unit 51 is configured, for example, by a video capture board or the like. The image input unit 51 receives a content image from a signal source 8 such as a DVD player or a communication device that is disposed outside the image control device 5 as is necessary. The image storage unit 52 is configured, for example, by a storage device such as a hard disk that is built in a computer or is externally disposed and can store image data that represents a content image P. The image data input to the image input unit 51 or the image data stored in the image storage unit 52 is output to the image correction unit 53 in a case where a content image P is displayed.

In addition, the image control device 5 may have a configuration in which only one of the image input unit 51 and the image storage unit 52 is arranged. Furthermore, a configuration may be used in which the image data input from the image input unit 51 is stored in the image storage unit 52, and the image data is appropriately read out so as to be input the image correction unit 53.

The image correction unit 53 includes a calculation section and a memory section, of which a detailed configuration is not shown in the figure. The calculation section is configured, for example, by a graphic processing unit (GPU) or the like. The memory section is configured by a video memory (VRAM), a non-volatile memory, or the like. The image correction unit 53 corrects the image data input from the signal source 8 by referring to the correction information such that an image projected onto the projection surface 9 by the projectors 21 to 24 based on image data after correction approximately coincides with an image represented by the image data before correction.

The calculation section performs various processes such as gamma correction, color correction, and the like for the image data input to the calculation section while using the memory section as an image buffer or the like. The various processes may be performed through calculation of a CPU of the computer by using a program, instead of the GPU. In addition, there may be a case where the arrangement of the pixels on the image data input from the image input unit 51 or the image storage unit 52 does not match the arrangement of the pixels of the image forming element of the projector 2, for example, a case where the number of pixels included in the image data is different from that of the image forming element. In such a case, the calculation section corrects the image data such that image data after correction matches the arrangement of the pixels of the image forming element by performing an interpolation process, a rendering process, or the like for the input image data. It may be configured that a process unit is disposed in each projector, and the above-described process is performed by the process unit for each projector.

The calculation section performs a position correcting process for the image data by referring to the correction information and generates partial image data. The correction information is stored in the storage unit (for example, a non-volatile memory). The correction information is information that represents the correspondence relationship between the position of each pixel occupying the total projection area A0 (see FIG. 2) on the projection surface 9 and the position of each pixel occupying the arrangement of the pixels of the image forming elements of the plurality of projector 2.

The correction information, for example, is stored in a table format as values of pixels of the image forming element. In other words, by referring to the table (the correction information), a pixel of the image forming element to which each image data is input for displaying a predetermined pixel in a predetermined position on the total projection area A0 can be known.

The calculation section, in order to display an image represented by the image data before correction that is performed through the position correcting process, that is, a content image to be displayed is displayed in the effective projection area A, for example, performs the process as below. For each pixel (hereinafter, referred to as a non-display pixel) that is disposed inside the total projection area A0 but is disposed on the outside of the effective projection area A, the calculation section sets data supplied to each pixel of the image forming element that corresponds to each non-display pixel through the correction information to non-display mask data (for example, data representing black).

In addition, for each pixel (hereinafter, referred to as a display pixel) that is disposed inside the effective projection area A, the calculation section sets data supplied to the pixel of the image forming element that corresponds to the display pixel through the correction information to data that is defined in image data as pixel data for a display pixel.

In a case where the position of the display pixel is displaced from the position of the lattice point of the lattice-shaped pixel array, an interpolation process is performed as is necessary. For example, by using pixel data of adjacent pixels that are adjacent to a pixel corresponding to the display pixel on the image data, pixel data corresponding to the position of the display pixel is acquired through interpolation. The positions of the adjacent pixels referred to at the time of the interpolation process, a weighting coefficient (an interpolation coefficient) by which the pixel data of the adjacent pixels is multiplied at the time of the interpolation process, and the like may be acquired in advance as a part of the correction information. By performing such a process for display pixels and non-display pixels that are included in each projection area, partial image data for the projector responsible for each projection area can be acquired.

The image correction unit 53 outputs the partial image data that is generated by the calculation section to the image output unit 54. The image output unit 54 outputs the partial image data output from the image correction unit 53 to the projector that is responsible for each partial image data. For example, the image output unit 54 outputs the partial image data representing the first partial image P1 shown in FIG. 1 to the first projector 21. The image output unit 54, similarly, outputs the partial image data representing the second to fourth partial images P2 to P4 to the second to fourth projectors 22 to 24.

The correction information calculating device 6 of this embodiment realizes the function by allowing the second computer to perform a predetermined process (to be described later) by using a program. The second computer is formed separately from the first computer in which the image control device 5 is installed and is electrically connected to the first computer, for example, through a bus cable or the like. It may be configured that, after the correction information is calculated by the correction information calculating device 6, the correction information is output to the image control device 5 through a bus cable, and then, a content image P is displayed by using the plurality of the projectors 2 and the image control device 5 in a state in which the first computer (the correction information calculating device 6) and the photographing device 4 are detached. In addition, it may be configured that, when there is displacement of the position in the projector 2, the first computer (the correction information calculating device 6) and the photographing device are installed again, the correction information as recalculated, and the correction information is updated.

The correction information calculating device 6 includes a correction information calculating unit (calculation unit) 61, an image analyzing unit 62, and a storage unit 63 as functional blocks.

The storage unit 63 is configured by a hard disk or a memory of the second computer. In the storage unit 63, measurement image data that represents a measurement pattern that is used for calculating the correction information is stored. The measurement pattern is an image in which a plurality of characteristic diagrams that are diagrams of shapes or luminance distributions that can be detected by an image processing technology such as an edge detecting process or a pattern recognizing process is arranged. By detecting the position and the shape of the characteristic diagram on the projection surface 9, the positions of the characteristic points on the projection surface 9 can be acquired. The characteristic points are points of which the positional relationship with the characteristic diagram on the measurement image data is known, and are, for example, the corners or a center point of the characteristic diagram.

The correction information calculating unit 61 and the image analyzing unit 62 are configured by the CPU, the memory, and the like of the second computer. When calculating the correction information, the correction information calculating unit 61 reads out the measurement image data that is stored in the storage unit 63 and directly or indirectly outputs (supplies) the measurement image data to each projector. In other words, a supply unit that supplies the measurement image data to each projector is configured by the correction information calculating unit 61 and the storage unit 63. Here, the correction information calculating unit 61 outputs the measurement image data to the image correction unit 53 of the image control device 5. The measurement image data is indirectly output to each projector through the image control device 5. The image control device 5 corrects the measurement image data to be formed so as to match the arrangement of the pixels of the image forming element as is necessary.

The image analyzing unit 62 receives photographed image data that represents a photographed image photographed by the photographing device 4. The image analyzing unit 62 detects the measurement pattern (a photograph pattern) inside the photographed image by performing, for example, an edge process, a pattern recognizing process, or the like for the photographed image data. The image analyzing unit 62 outputs the photographed measurement data to the correction information calculating unit 61 as image data representing the photograph pattern.

The correction information calculating unit 61 calculates the correction information by comparing the positions of a plurality of the characteristic points of a photograph pattern acquired by photographing a measurement pattern projected on the projection surface 9 by the projectors 21 to 24 based on the measurement image data and the positions of the plurality of characteristic points defined in the measurement image data. More specifically, the correction information calculating unit 61 calculates the correction information by comparing the positions of the characteristics points on the measurement image data representing the measurement pattern that becomes the origin of the photographed measurement data and the positions of the characteristic points on the measurement image data. The correction information calculating unit 61 outputs the calculated correction information to the image control device 5. The image control device 5 updates the correction information by storing the correction information that is output from the correction information calculating device 6 in the storage section of the image correction unit 53.

Figure 4:
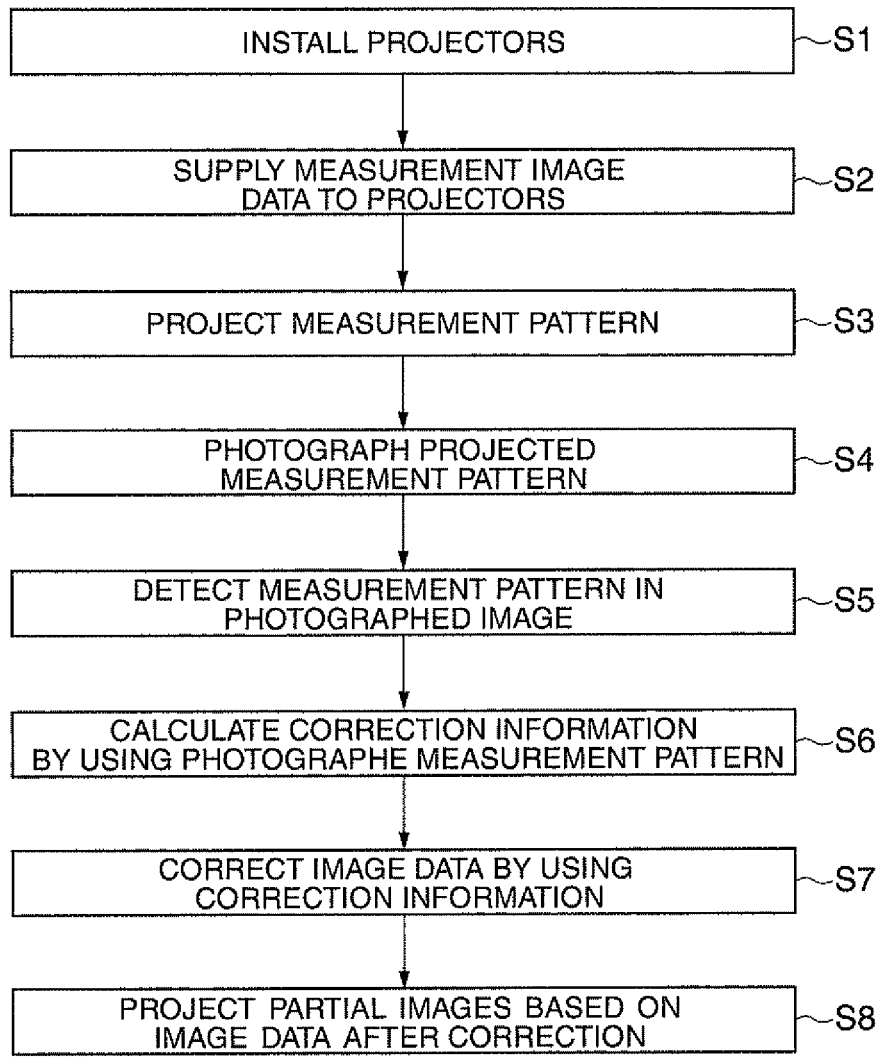
FIG. 4 is a flowchart representing the process flow until a content image is displayed.

FIG. 4 is a flowchart representing the process flow until a content image P is displayed. Here, an example in which the correction information is calculated at the time of installing the image display system 1 will be described. By performing the processes of Steps S2 and S5 to S7 as below, one type of an image processing method according to an embodiment of the invention can be performed. By using a program that allows a computer to perform the processes of Steps S2, S5, and S6, the function of a correction information calculating device according to an embodiment of the invention can be realized. By using a program that allows a computer to perform the processes of Steps S2 and S5 to S7, the function of an image processing apparatus according to an embodiment of the invention can be realized.

As shown in FIG. 4, first, a plurality of projectors 2 is disposed on the projection surface 9, and the arrangement of the projectors is roughly adjusted as is necessary (Step S1). In Step S1, for example, an arrangement guide representing the contour of the projection area (hereafter, referred to as a partial projection area) is projected onto a projection surface 9 from each of the first to fourth projectors 21 to 24. Then, each projector is moved while referring to the arrangement guide, whereby the position of each partial projection area occupying the total projection area A0 is roughly adjusted.

Here, a case where the position of the projector is roughly adjusted through an eye contact. The amount of deviation of the relative position in a plurality of projection areas is influenced by the actual scale and the like of the projection area and is considered to be about several pixels on the whole. For example, in a case where the diagonal size of the projection area is 100 inches, and the number of pixels (including display pixels and non-display pixels) arranged in the projection area is 1920×1080, the pixel pitch in the projection area is about 1.15 mm. For example, a positional gap corresponding to ten pixels becomes a positional gap of 1.15 cm in the actual size on the projection surface 9, and this positional gap is considered to be identifiable through an eye contact from a position apart away from the projection surface 9 by several meters. Accordingly, it is though that the amount of deviation of the relative position in the projection area can be adjusted to be about several pixels.

In addition, in a case where partial images that are two dimensionally arranged are displayed, FIG. 1 shows an example in which the projectors 2 are two dimensionally arranged similarly to the arrangement of the partial images.

However, the arrangement of the projectors may be different from the arrangement of the partial images. For example, the partial images can be two-dimensionally arranged by arranging the projectors one dimensionally and adjusting the projection directions of the projectors. However, by forming the arrangement of the projectors to be the same as the arrangement of the partial images, the correspondence relationship between the projector and the partial image can be easily checked, and the distortion of the partial image due to a difference in the projection direction can be decreased. In addition, a content image may be displayed by one-dimensionally arranging two or more partial images. In addition, in a case where the partial images are two-dimensionally arranged, the number of the partial images in each arrangement direction may be three or more. In a case where, after installation of the image display system 1, for example, the correction information is calculated at the time of maintenance of the image display system 1, the above-described Step S1 can be omitted.

Next, the correction information calculating unit 61 of the correction information calculating device 6 supplies the measurement image data representing the measurement pattern of each projector to a target projector (Step S2). The first to fourth projectors 21 to 24 are operated so as to project the measurement patterns onto the projection surface 9 based on the supplied measurement image data (Step S3). Here, the measurement patterns are projected in parallel by the first to fourth projectors 21 to 24.

Figure 5:
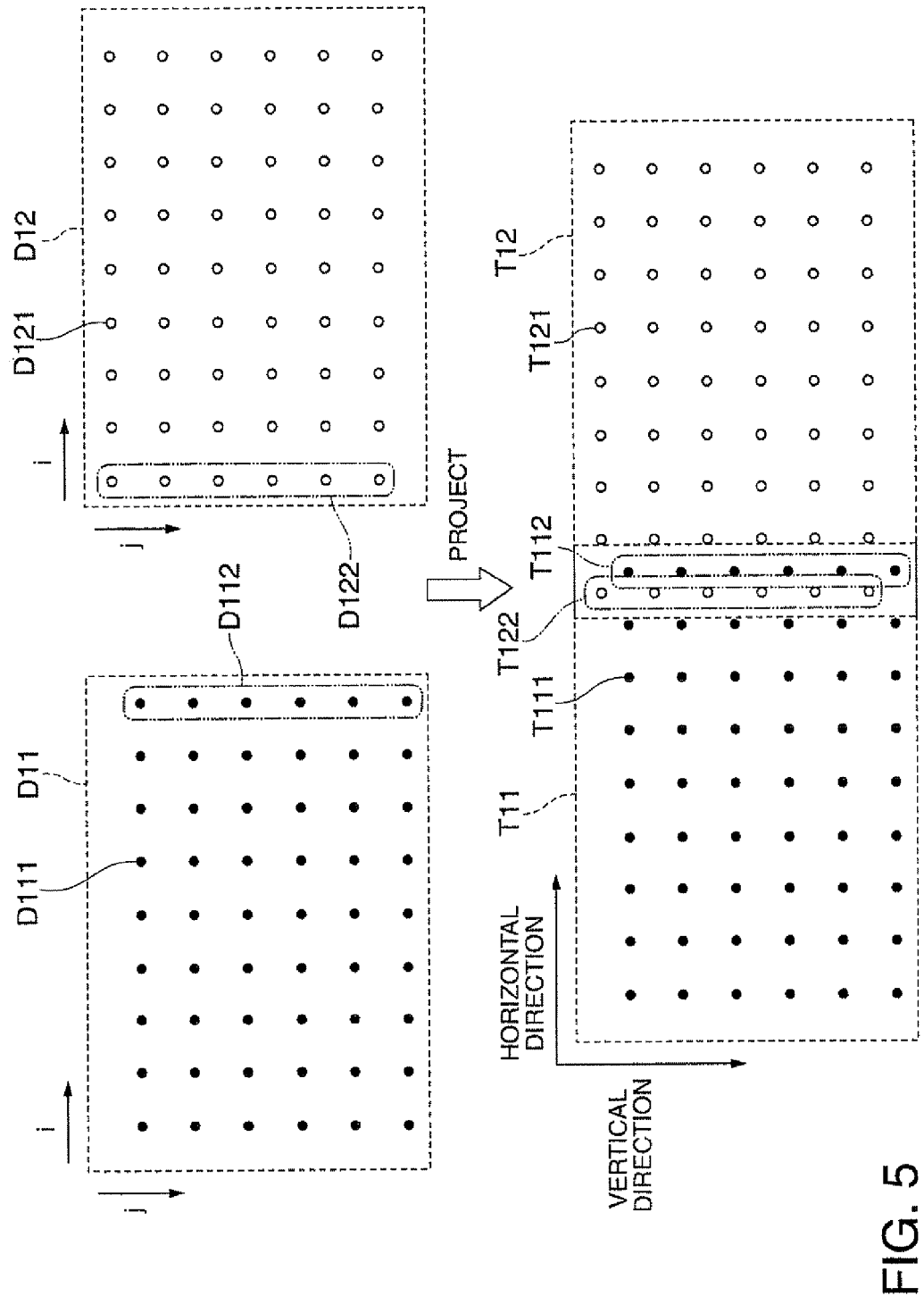
FIG. 5 is an explanatory diagram representing the measurement patterns of a first example.
Figure 6:
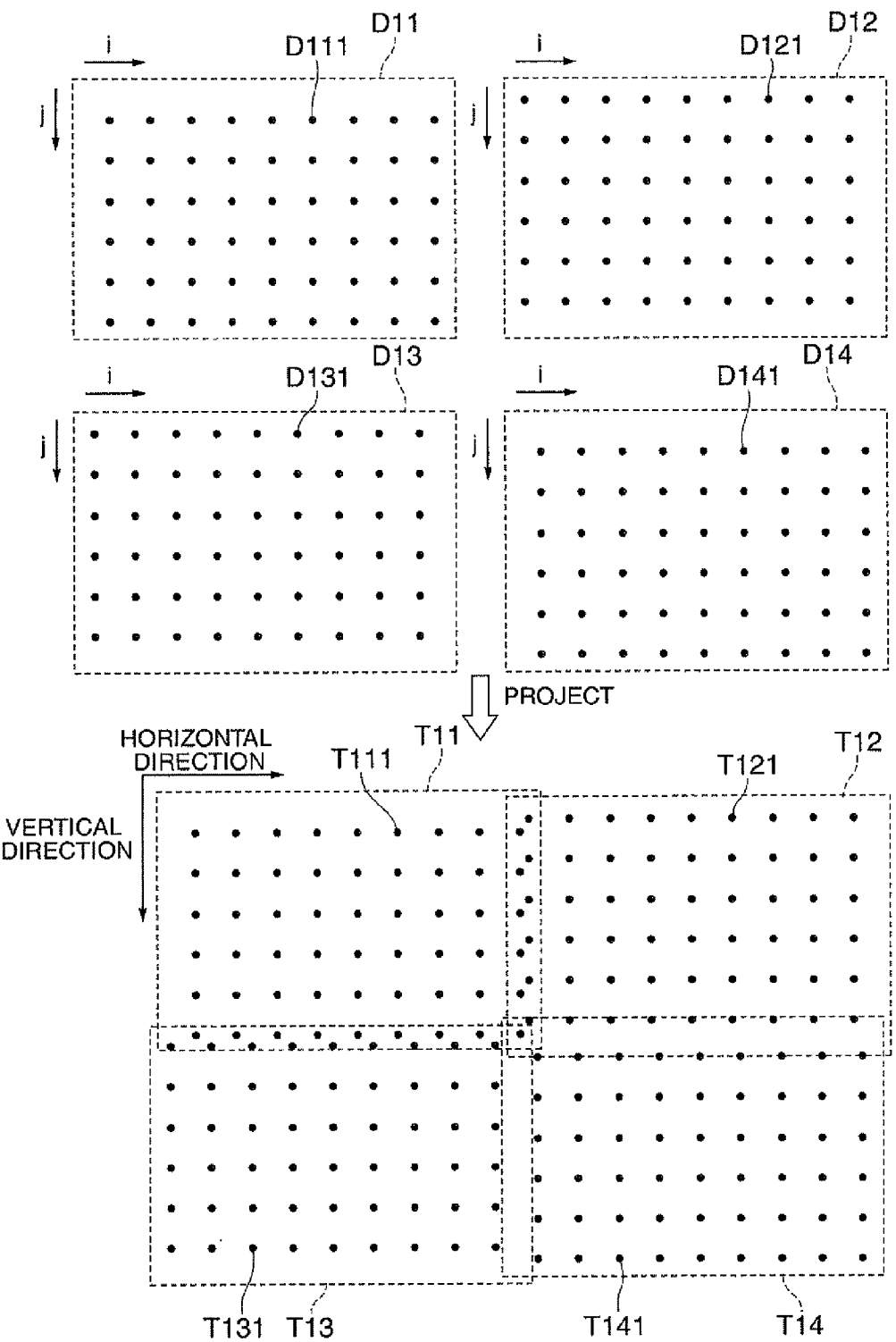
FIG. 6 is an explanatory diagram representing a combination of projected measurement patterns of the first example.

FIG. 5 is an explanatory diagram representing the measurement patterns of a first example. FIG. 6 is an explanatory diagram representing a combination of the projected measurement patterns of the first example. FIG. 5 illustrates one pair of the measurement patterns that are adjacent on the projection surface. In order to easily identify the characteristic diagram by using the one pair of the measurement patterns, for the convenience of the description, the characteristic diagram is denoted by a different mark for each measurement pattern.

According to the embodiment of the invention, the positions of the characteristic point on the measurement image data that represents each measurement pattern are set such that the characteristic points of one measurement pattern of one pair of the measurement patterns projected onto one pair of projection areas that overlap each other on the projection surface 9 do not overlap the characteristic points of the other measurement pattern.

Each measurement pattern is configured by an arrangement of pixels that are arranged in the direction of "i" and the direction of "j". The measurement image data is formed so as to match the arrangement of the pixels of the image forming element in a step in which the measurement data is supplied to each projector. For example, in a case where the arrangement of the pixels of the image forming element is 1920×1080, the measurement data is supplied to the projector as the image data of an image in which 1920 pixels are aligned in the direction of "i" and 1080 pixels are aligned in the direction of "j".

A first measurement pattern D11 represented by the first measurement image data for the first projector includes a plurality of characteristic diagrams D111 that are regularly arranged. The characteristic diagram D111 of this example is in a dot shape (a spot shape) that is configured by one, two or more pixels, and the center point thereof is used as the characteristic point. The shape of the characteristic diagram is not particularly limited, as long as the shape can be detected, and the position associated with the shape can be specified as the position of the characteristic point. The shape of the characteristic diagram, for example, may be segments (cross hatch) intersecting with each other, a square, or the like. In a case where the cross hatch is used, two segments are detected, for example, through half conversion or the like, and the position of the intersection can be uniquely acquired, and accordingly, the intersection can be used as a characteristic point. On the other hand, in a case where a square shape is used, the center of the characteristic diagram may be used as a characteristic point, or points that are the four corners can be used as the characteristic points.

A plurality of the characteristic diagrams D111 is arranged in the direction of "i" with a predetermined pitch, and is arranged in the direction of "j" with a predetermined pitched. In other words, the plurality of the characteristic diagrams D111 is regularly arranged, so that the characteristic point of each characteristic diagram is positioned on a lattice point of an orthogonal lattice. A plurality of characteristic diagrams D121, similarly to the characteristic diagram D111, is arranged with a predetermined pitch in the direction of will and the direction of "j".

All the characteristic diagrams D111 and D121 that are included in the first and second measurement patterns D11 and D12 of this example have the same shape and the same size. Here, an area having a line joining the characteristic points arranged on the outermost periphery in the arrangement of the characteristic diagrams of each measurement pattern as its contour is assumed to be an arrangement area of the characteristic diagrams. The size of the arrangement areas of the first and second measurement patterns D11 and D12, that is, the numbers of pixels of the arrangement areas in the direction of "i" coincide with each other, and the number of pixels of the arrangement areas in the direction of "j" coincide with each other. In addition, the positions of the arrangement areas with each measurement pattern of the first and second measurement patterns D11 and D12 used as a reference, for example, the coordinates of the corners of the arrangement areas with the coordinates (i,j)=(0,0) of the first angle (a corner located on the upper left side in the figure) of each measurement pattern used as a reference are different from each other. More specifically, the position of the arrangement area of the second measurement pattern D12 is a position shifted from the position of the arrangement area of the first measurement pattern D11 by a half of the pitch of the characteristic points in the direction of "i" and the direction of "j". The arrangements of the characteristic points within the arrangement areas of the first and second measurement patterns D11 and D12 coincide with each other. In other words, when the arrangement areas of the first and second measurement patterns D11 and D12 overlap each other without any misalignment, the characteristic points overlap each other without any misalignment in the measurement patterns.

In this example, the hue value and the gray scale value of an area of the first measurement pattern D11 other than the characteristic diagram D111 are set be the same as the hue value and the gray scale value of an area of the second measurement pattern D12 other than the characteristic diagram D121. In addition, the distributions of the hue value and the gray scale value of the characteristic diagram D111 are set to be the same as distributions of the hue value and the gray scale value of the characteristic diagram D121.

The first measurement pattern D11 as above is projected onto the first projection area A1, and the second measurement pattern D12 is projected onto the second projection area A2. The arrangement direction of the display pixels in the direction (horizontal direction) in which the first and second projection areas A1 and A2 are aligned corresponds to the direction of "i" out of the arrangement directions of the pixels in the measurement pattern. In addition, the arrangement direction of the display pixels in a direction (vertical direction) intersecting the direction in which the first and second projection areas A1 and A2 are aligned corresponds to the direction of "j" out of the arrangement directions of the pixels in the measurement pattern. In other words, in the positional relationship of the first and second projection areas A1 and A2, the direction of "i" becomes the first arrangement direction, and the direction of "j" becomes the second arrangement direction.

Here, among the characteristic diagrams D111 of the first measurement pattern D11, a characteristic diagram column D112 that is formed from the characteristic diagrams D111 aligned in the second arrangement direction (the direction of "j") will be focused. The characteristic diagrams D111 belonging to the characteristic diagram column D112 out of the characteristic diagrams D111 of the first measurement pattern D11 are arranged on the end located on the side overlapping the second measurement pattern D12 in the first arrangement direction (the direction of "i").

The coordinates of the characteristic points (hereinafter, simply referred to as the characteristic points of the characteristic diagram column D112) represented by the characteristic diagrams D111 belonging to the characteristic diagram column D112 in the ij coordinate system are denoted by (i, j)=(a, b+cN). Here, "a" denotes the coordinate of a pixel (hereinafter, referred to as a reference pixel), which is located on the end in the second arrangement direction (the direction of "j"), of the pixel column to which the characteristic points of the characteristic diagram column D112 belong in the direction of "i". In addition, "b" denotes the coordinate of the characteristic point, which is at a position closest to the reference pixel, out of the characteristic points of the characteristic diagram column D112 in the direction of "j". In addition, "c" denotes a pitch of the characteristic points, and N denotes an integer (the number of the characteristic points of the characteristic diagram column D112 is (N+1)) that is equal to or greater than zero.

Similarly, a characteristic diagram column D122 of the second measurement pattern D12 will be focused. The characteristic diagrams D121 belonging to the characteristic diagram column D122 out of the characteristic diagrams D121 of the second measurement pattern D12 are arranged on the end located on the side overlapping the first measurement pattern in the second arrangement direction (the direction of "j").

The coordinates of the characteristic points of the characteristic diagram column D122 in the ij coordinate system are denoted by (i, j)=(d, e+cM). Here, "d" denotes the coordinate of a reference pixel of the characteristic diagram column D122 in the direction of "i". In addition, "e" denotes the coordinate of the characteristic point, which is at a position closest to the reference pixel, out of the characteristic points of the characteristic diagram column D122 in the direction of "j". In addition, "c" denotes a pitch of the characteristic points, and M denotes an integer (the number of the characteristic points of the characteristic diagram column D122 is (M+1)) that is equal to or greater than zero.

Here, a to e, N, and M described above are set so as to satisfy the following conditions. The values of a and d are values that can be freely selected. For example, the values of a and d are set such that, for example, the characteristic points are disposed in an area in which the first and second measurement patterns D11 and D12 overlap each other.

The values of b and e are not particularly limited, as long as there are different from each other. However, the values of b and e may be set such that the absolute value of a difference between b and e is greater (for example, ten pixels or more) than an estimated value (for example, several pixels) of the amount of deviation of the relative position of the first and second projection areas A1 and A2 at the time of installing the projectors as descried above. In addition, the values of b and e may be set such that the absolute value of a difference between b and e is approximately a half of c, that is, about a value of c/2 acquired through rounding-off or the like±one pixel.

The value of c may be a value that is common to the first and second measurement patterns D11 and D12 and may be a same value or a different value for each of a plurality of the characteristic points. For example, the value of c may be set as a function of N (or M) in which the value of c decreases as the N (or M) increases. As the value of c decreases, the number of the characteristic points can be increased by that amount, and accordingly, the correspondence relationship between the position of the pixel occupying the array of the pixels of the image forming element of each projector and the position of the display pixel occupying the total projecting area A0 can be acquired with high precision. When the value of c is set to be great, the number of characteristic points can be decreased while disposing the characteristic points of the measurement pattern in a broad range. Accordingly, the load of a calculation process for acquiring the above-described correspondence relationship can be decreased, whereby the correspondence relationship can be efficiently acquired. For balancing between two viewpoints described above, the value of c may be set to be equal to or greater than 20 pixels and equal to or less than 100 pixels.

The above-described conditions may be satisfied by at least the characteristic diagrams D111 aligned on the end located on the side overlapping the second measurement pattern D12 out of the characteristic diagrams D111 of the first measurement pattern D11 and at least the characteristic diagrams D121 aligned on the end located on the side overlapping the first measurement pattern D11 out of the characteristic diagrams D121 of the second measurement pattern D12.

On the projection surface 9, a first projection measurement pattern T11 corresponding to the first measurement pattern D11 is displayed. The first projection measurement pattern T11 includes projection characteristic diagrams T111 corresponding to the characteristic diagrams D111. Similarly, on the projection surface 9, a second projection measurement pattern T12 corresponding to the second measurement pattern D12 is displayed. The second projection measurement pattern T12 includes projection characteristic diagrams T121 corresponding to the characteristic diagrams D121.

Here, in the first and second projection measurement patterns T11 and T12, a projection characteristic diagram column T112 corresponding to the characteristic diagram column D112 and a projection characteristic diagram column T122 corresponding to the characteristic D122 will be focused. Since the first and second measurement patterns D11 and D12 are set so as to satisfy the above-described conditions, the position of the projection characteristic diagram T111 and the position of the projection characteristic diagram T121 may be easily misaligned in a direction (the vertical direction) corresponding to the second arrangement direction (the direction of "j") on the projection surface 9. In other words, a probability that the projection characteristic diagrams T111 and T121 overlap with each other is lowered. Accordingly, even in a case where the first and second measurement patterns D11 and D12 are projected in parallel, the projection characteristic diagram T111 and the projection characteristic diagram T121 can be detected with high precision.

In addition, since the positions of the characteristic diagrams T111 and T121 can be easily misaligned in a direction (the vertical direction) intersecting the alignment direction (the horizontal direction) of the first and second projection areas A1 and A2, the probability that the projection characteristic diagrams T111 and T121 overlap with each other is lowered regardless of the amount of overlapping in the horizontal direction of the first and second projection areas A1 and A2. The amount of overlapping in the horizontal direction can be represented by a ratio of the width of one projection area in the horizontal direction to the width of an overlapping area between one pair of the projection areas in the horizontal direction when the one pair of the projection areas are aligned in the horizontal direction or the like.

Particularly when the values of b and e are, for example, set to be equal to or greater than 10 pixels based on the estimated amount of deviation of the relative positions of the first and second projection areas A1 and A2 as described above, the probability that the projection characteristic diagrams T111 and T121 overlap with each other is lowered even when there is a difference between the relative positions of the first and second projection areas A1 and A2. In addition, when the values of b and e are set such that the absolute value of a difference between b and e is approximately a half of c, the probability that the projection characteristic diagrams T111 and T121 overlap with each other is lowered in a case where the first projection area A1 is misaligned with respect to the second projection area A2 to the positive side or the negative side in the horizontal direction.

As shown in FIG. 6, the correction information calculating unit 61, other than the first and second measurement patterns D11 and D12, supplies a third measurement pattern D13 to the third projector 23 and supplies a fourth measurement pattern D14 to the fourth projector 24. The third measurement pattern D13 is projected onto the third projection area A3, and the fourth measurement pattern D14 is projected onto the fourth projection area A4.

Here, the arrangement direction (the direction of "i") of the pixels corresponding to the alignment direction (the horizontal direction) of the third and fourth projection areas A3 and A4 on the measurement image data is set to the first arrangement direction, and a direction perpendicular to the first arrangement direction is set to the second arrangement direction (the direction of "j"). Among the characteristic diagrams D131 of the third measurement pattern D13 and the characteristic diagrams D141 of the fourth measurement pattern D14, the characteristic diagrams D131 and D141 (a characteristic diagram column) arranged on the end located on a side on which the third and fourth measurement patterns D13 and D14 overlap with each other in the first arrangement direction will be focused. Among the characteristic points as focused targets, the position of the characteristic point, which is represented by the characteristic diagram D131, in the second arrangement direction is misaligned with respect to the position of the characteristic point, which is represented by the characteristic diagram D141, in the second arrangement direction.

Next, the arrangement direction (the direction of "j") of the pixels of the measurement pattern corresponding to the alignment direction (the vertical direction) of the first and third projection areas A1 and A3 is set to the first arrangement direction, and a direction perpendicular to the first arrangement direction is set to the second arrangement direction (the direction of "i"). Among the characteristic diagrams D111 of the first measurement pattern D11 and the characteristic diagrams D131 of the third measurement pattern D13, the characteristic diagrams D111 and D131 (a characteristic diagram column) arranged on the end located on a side on which the first and third measurement patterns D11 and D13 overlap with each other will be focused. Among the characteristic diagrams as focused targets, the position of the characteristic point, which is represented by the characteristic diagram D111, in the second arrangement direction (the direction of "i") is misaligned with respect to the position of the characteristic point, which is represented by the characteristic diagram D131, in the second arrangement direction (the direction of "i"). Such correspondence relationship between the positions of the characteristic points is also satisfied for the second and fourth measurement patterns D12 and D14.

On the projection surface 9, a third projection measurement pattern T13 corresponding to the third measurement pattern D13 is displayed. The third projection measurement pattern T13 includes the projection characteristic diagrams T131 corresponding to the characteristic diagrams D131. Similarly, on the projection surface 9, a fourth projection measurement pattern T14 corresponding to the fourth measurement pattern D14 is displayed. The fourth projection measurement pattern T14 includes the projection characteristic diagrams T141 corresponding to the characteristic diagrams D141. Since the first to fourth measurement image data is set so as to satisfy the above-described relationship, the probability of overlapping between any of the projection characteristic diagrams T111 to T114 is lowered.

Returning back to the description presented with reference to FIG. 4, the photographing device 4 photographs an area including the first to fourth projection measurement patterns T11 to T14 on the projection surface 9 (Step S4).

Next, the image analyzing unit 62 of the correction information calculating device 6 detects the measurement pattern (photographed pattern) included in a photographed image that is photographed by the photographing device 4 (Step S5).

In a case where a photographing operation is performed for each projection measurement pattern, and several photographing operations are performed, the photographing device may be moved between photographing operations. When the photographing device is moved, the position of the projection measurement pattern occupying the photographed image is changed for each photographed image. Accordingly, there are disadvantages that the process for detecting the characteristic point becomes complicated, or an error in the position of the detected characteristic point increases. By photographing an area including all the measurement patterns projected by two or more projectors, the number of the photographing operations can be described, and the effort or the time required for the photographing operation can be decreased, and the above-described disadvantages can be avoided.

Next, the correction information calculating unit of the correction information calculating device 6 calculates the correction information by comparing the photographed pattern and the measurement pattern represented by the measurement image data (Step S6). The method of calculating the correction information is not particularly limited, as long as it is a method capable of acquiring information representing the position of the pixel of the image forming element of each projector and the position of the pixel on the projection surface 9. For example, as the method of calculating the correction information, there are the following two methods.

In a first method, the correction information calculating unit 61 acquires the position of each characteristic diagram of the photographed pattern by detecting the characteristic diagram included in the photographed pattern. Then, a projection conversion in which the measurement pattern defined in the measurement image data into a photographed pattern is acquired. Through this projection conversion, the coordinates (i,j) of each pixel on the image data is converted, and the correction information as a data table for each pixel is calculated. In addition, even in a case where a projection conversion for converting the photographed pattern into a measurement pattern defined in the measurement image data is acquired, correction information representing the correspondence relationship between the coordinates of the pixel of the image forming element and the position of the pixel on the projection surface is acquired.

Figure 7:
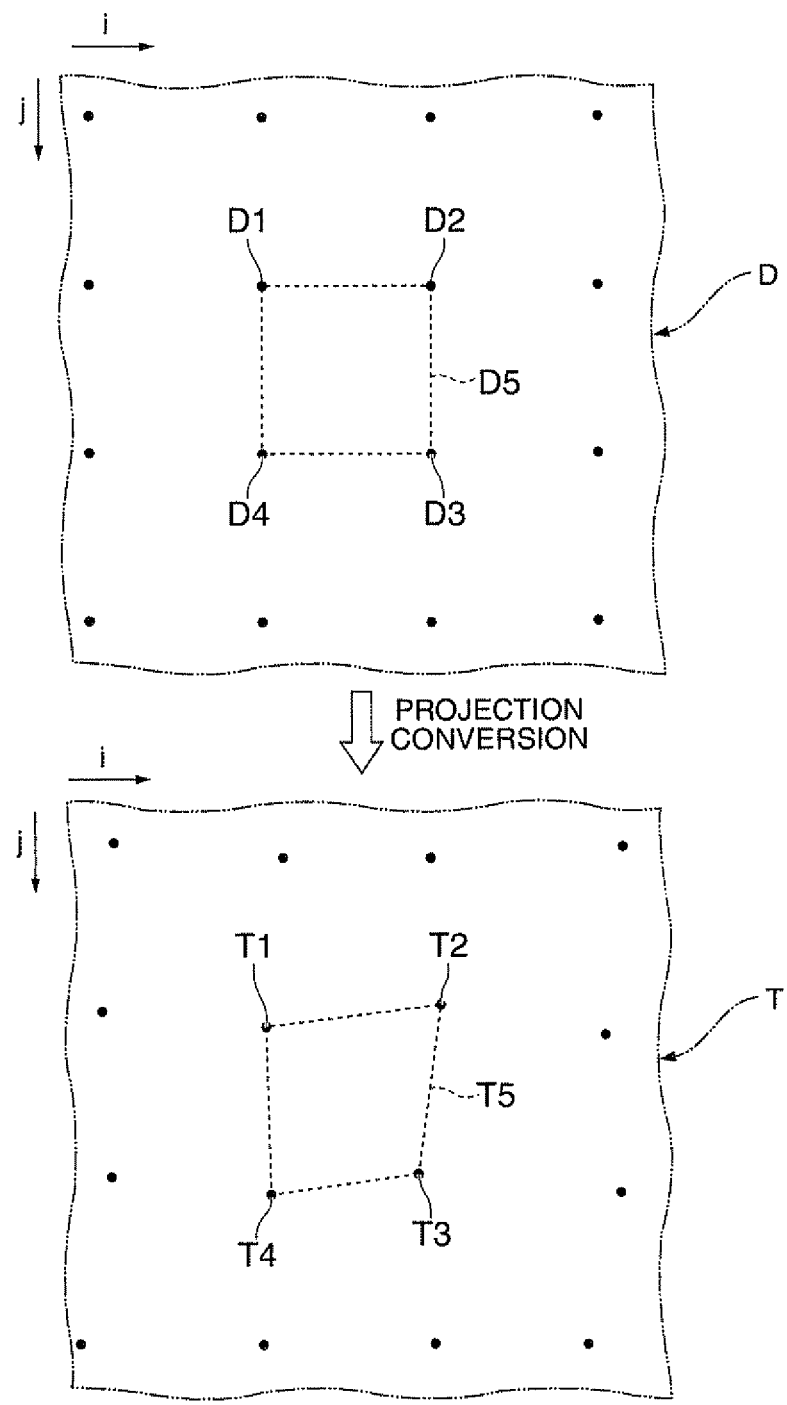
FIG. 7 is an explanatory diagram showing an example of a method of calculating correction information.

FIG. 7 is an explanatory diagram showing an example of a method of calculating the correction information. FIG. 7 conceptually illustrates a part of the measurement pattern D defined in the measurement image data and the photographing pattern T on the image data. In FIG. 7, reference numerals D1 to D4 represent characteristic points included in the measurement pattern D. The characteristic points D1 to D4 are selected such that a line sequentially joins the characteristic points forms the contour of the area D5. In FIG. 7, reference numeral T1 to T4 represents the characteristic points included in a photographed pattern T. The characteristic points T1 to T4 are characteristic points corresponding to the characteristic points D1 to D4 of the projected measurement pattern D. A line sequentially joining the characteristic points T1 to T4 forms the contour of the area T5.

The conversion equations for the projection conversion can be represented in Equations (1) and (2) shown below. In Equations (1) and (2), (x, y) represents the ij coordinates (i, j) of an arbitrary point before conversion, and (X, Y) represents the ij coordinates (i,j) of the converted position of this point. In addition, a to h represent conversion coefficients, and by acquiring a to h, one projection conversion is acquired.

$$X=(ax+by+c)/(gx+hy+1) \quad (1)$$

$$Y=(dx+ey+f)/(gx+hy+1) \quad (2)$$

Each of the coordinates of the characteristic points D1 to D4 are defined in the measurement image data and are known. Each of the coordinates of the characteristic points T1 to T4 are known by detecting the characteristic points from the photographed pattern T. When (x, y) shown in Equations (1) and (2) are substituted by the coordinates of the characteristic point D1, and (X, Y) is substituted by the coordinates of the characteristic points T1, two relational equations of a to h are acquired. Similarly, by substituting the coordinates of a set of characteristic points D2 and T2, a set of characteristic points D3 and T3, and a set of characteristic points D4 and T4 coordinates in the equations, eight relational equations are acquired for eight unknown letters. By solving this linear equations with eight variables, a to h used for the projection conversion for converting the area D5 into the area T5 are acquired. By substituting (x, y) with the coordinates of each pixel included on the periphery and the inside of the area D5 in the acquired projection conversion, the coordinates of each pixel, which has one-to-one correspondence for each pixel of the area D5, on the area T5 are acquired.

Here, the characteristic points D1 to D4 are selected based on the characteristic points included in the measurement pattern, and a projection conversion for the area D5 forming a part of the measurement pattern D is acquired. Then, by selecting other characteristic points as the characteristic points D1 to D4, the projection conversion is acquired with a different area D5. By using the acquired projection conversion, as described above, the coordinates of each pixel of the area T5 that has one-to-one correspondence relationship for each pixel of the area D5 are acquired. As above, the coordinates of each pixel of the measurement pattern and the coordinates of the pixel of the photographed pattern corresponding to each photographed pattern are acquired by acquiring the projection conversion for each part of the measurement pattern. The coordinates of each pixel of the measurement pattern has correspondence relationship with the position of the pixel of the image forming element of the projector. In addition, the coordinate of the photographed pattern has correspondence relationship with the position of the pixel on the projection surface. Accordingly, as a result, correction information that represents the correspondence relationship between the coordinates of the pixel of the image forming element and the position of the pixel is acquired.

For example, by performing the above-described projection conversion for each of the coordinates of each pixel of the image forming element, the coordinates of the pixel (hereinafter, referred to as a converted pixel) on the projection surface 9 are acquired. By referring to a maximum value and a minimum value of the coordinates of the converted pixel, the range of the effective projection area A is set automatically or manually. Then, by arranging the array of the pixels (display pixels) corresponding to the format of the content image or the number of pixels, the coordinates of each display pixel on the projection surface 9 are acquired based on the set values of the effective projection area A. In a case where the coordinates of the display pixel are mismatched with the coordinates of the converted pixel, an interpolation coefficient representing the weight of the interpolation corresponding to a distance between the peripheral converted pixel and the display pixel may be acquired. This interpolation coefficient is fixed for each display pixel and may be stores as a part of the correction information.

In a second method, similarly to the first method, the position of the characteristic point for each characteristic diagram in the photographed pattern is acquired. Then, a projection conversion (an inverse conversion of the projection conversion according to the first method) for converting the photographed pattern into a measurement pattern defined in the measurement image data is acquired. In addition, for example, the range of the total projection area A0 is estimated by using the position of the characteristic point included in the photographed pattern, and the range of the effective projection area A is set automatically or manually. The, by arranging the array of the display pixels corresponding to the format of the content image or the number of pixels inside the effective projection area A, the coordinates of each display pixel on the projection surface 9 are acquired based on the set value of the range of the effective projection area A. By converting the acquired coordinate of each display pixel through projection conversion, the position of the pixel (hereinafter, referred to as a modulation unit), which corresponds to each display pixel on the projection surface 9, on the image forming element is acquired. In a case where the position of the modulation unit is not matched with the actual position of the modulation unit, in other words, in a case where two or more display pixels corresponds to the modulation unit, an interpolation coefficient may be acquired, so that the pixel data input to each modulation unit can be acquired through interpolation as is necessary. As described above, the acquired interpolation coefficient may be stores as a part of the correction information.

Returning back to the description presented with reference to FIG. 4, in a case where the content image P is displayed, the image control device 5 generates partial image data for each projector based on the image data representing the content image P, and performs a position correction process for the image data by using the correction information (Step S7).

Next, the image processing apparatus 3 supplies the partial image data after the position correcting process to the target projector. Each of the first to fourth projectors 21 to 24 projects a partial image based on the supplied partial image data (Step S8). As above, the content image P formed from the first to fourth partial images P1 to P4 is displayed.

According to the correction information calculating device of this embodiment, even in a case where the measurement patterns D11 to D14 are projected by a plurality of projectors in parallel, it can be avoided that the projection characteristic diagrams T111, T121, T131, and T141 overlap with one another on the projection surface 9. Accordingly, the position of the projected characteristic diagram can be detected with high precision by projecting the measurement pattern by using a plurality of projectors in a parallel manner. Therefore, the correction information representing the correspondence relationship between the position of the pixel on the projection surface and the position of the pixel defined in the image data is effectively acquired.

In addition, in the first to fourth measurement patterns D11 to D14, the shape and the size of the characteristic diagrams are the same, and accordingly, complication of the process of detecting the characteristic diagram can be avoided. In addition, in the first to fourth measurement patterns D11 to D14, the hues of the outside and the inside of the characteristic diagram are formed to be approximately be the same, and accordingly, a decrease in the precision of detection of the characteristic diagram due to color unevenness or the like can be avoided.

According to the image processing apparatus or the image processing method of this embodiment, the distortion of the partial images and the difference in the relative positions can be corrected with high precision while lessening the effort and the time required for acquiring the correction information.

According to an image display system of this embodiment, the effort and the time required for acquiring the correction information can be lessened so as to improve convenience. In addition, distortion of the partial image and a difference in the relative positions are corrected with high precision, whereby the content image can be displayed with high resolution or high luminance on a big screen.

The technical scope of the invention is not limited to the above-described embodiments. For example, the measurement pattern applicable to an embodiment of the invention may be variously changed in the form. Hereinafter, examples of the measurement pattern will be described.

Figure 8A:
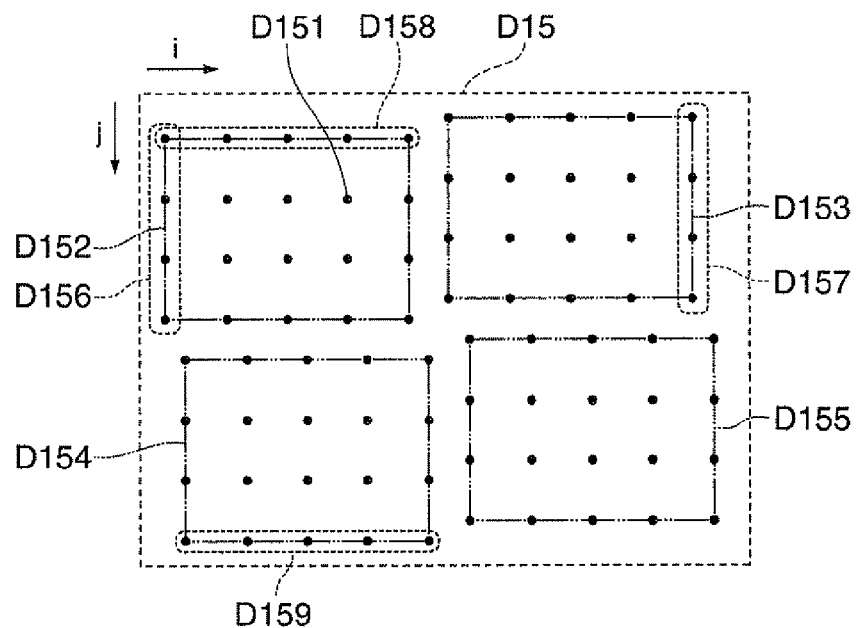
FIG. 8A is an explanatory diagram showing a second example of the measurement pattern.
Figure 8B:
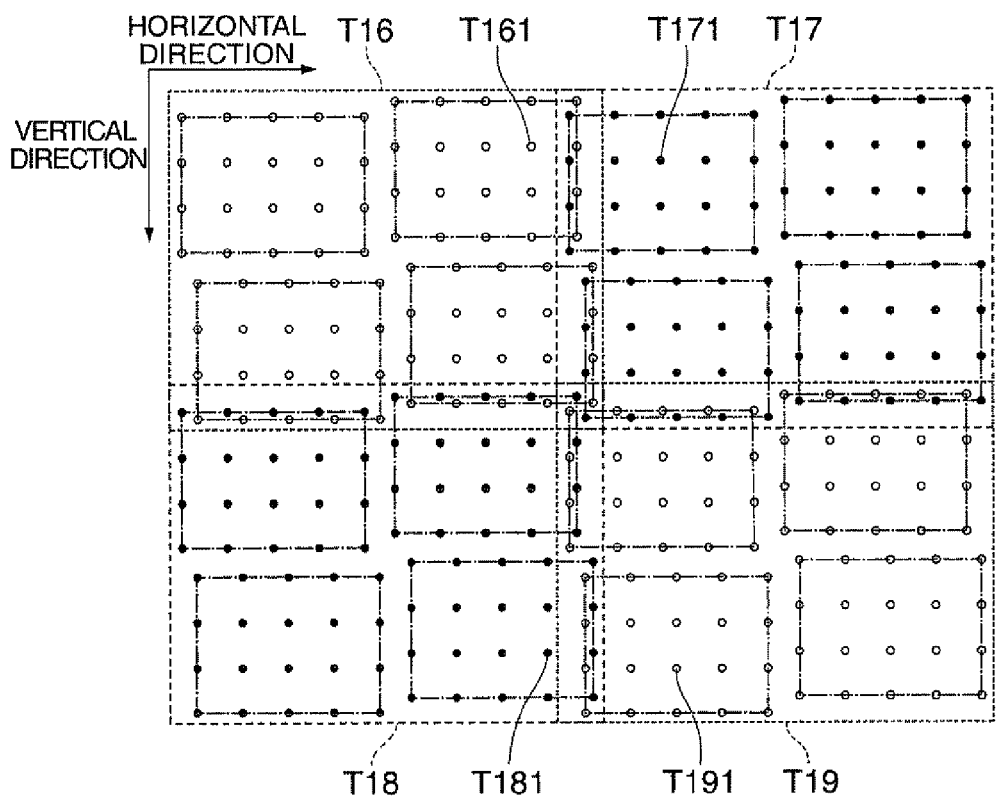
FIG. 8B is an explanatory diagram showing the second example of a projected measurement pattern.

FIG. 8A is an explanatory diagram showing a second example of the measurement pattern. FIG. 8B is an explanatory diagram showing the second example of a projected measurement pattern. The second example of the measurement pattern is an example of the measurement pattern that can be used in common to a plurality of projectors. In FIG. 8B, in order to easily identify the characteristic diagrams in adjacent measurement patterns, for the convenience of description, the characteristic diagrams are denoted by different marks for each measurement pattern.

The measurement pattern D15 of the second example shown in FIG. 8A includes a plurality of characteristic diagrams D151. The plurality of characteristic diagrams D151 is arranged so as to be divided into first to fourth arrangement areas D152 to D155. In each arrangement area, the characteristic diagrams D151 are regularly aligned with a predetermined pitch in the direction of "i" and the direction of "j".

The first arrangement area D152 and the second arrangement area D153 are aligned in the direction of "i", and the third arrangement area D154 and the fourth arrangement area D155 are aligned in the direction of "i". One pair of the arrangement areas aligned in the direction of "i", for example, the first arrangement area D152 and the second arrangement area D153 will be focused. In one pair of the arrangement areas, the characteristic diagrams D151 that are arranged on the outermost side in the direction of "i" are regularly aligned in the direction of "j" so as to configure a characteristic diagram column.

The coordinates of the characteristic point represented by each characteristic diagram belonging to the first characteristic diagram column D156 of the first arrangement area D152 in the direction of "j" are different from the coordinates of the characteristic point represented by any characteristic diagram belonging to the second characteristic diagram column D157 of the second arrangement area D153. Here, in a case where the position of the characteristic diagram D151 of the first arrangement area D152 is shifted in parallel in the direction of "i", the position of each characteristic diagram of the first arrangement area D152 does not coincide with the position of any characteristic diagram D151 of the second arrangement area D152, regardless of the amount of shift. In addition, the relationship between the arrangement of the characteristic diagram D151 of the third arrangement area D154 and the arrangement of the characteristic diagram of the fourth arrangement area D155 is similarly formed.

The first arrangement area D152 and the third arrangement area D154 are aligned in the direction of "j", and the second arrangement area D153 and the fourth arrangement area D155 are aligned in the direction of "j". One pair of the arrangement areas aligned in the direction of "j", for example, the first arrangement area D152 and the third arrangement area D154 will be focused. In one pair of the arrangement areas, the characteristic diagrams D151 that are arranged on the outermost side in the direction of "j" are regularly aligned in the direction of "i" so as to configure a characteristic diagram column.

The coordinates of the characteristic point represented by each characteristic diagram belonging to the third characteristic diagram column D158 of the first arrangement area D152 in the direction of "i" are different from the coordinates of the characteristic point represented by a characteristic diagram belonging to the fourth characteristic diagram column D159 of the third arrangement area D154. Here, in a case where the position of the characteristic diagram D151 of the first arrangement area D152 is shifted in parallel in the direction of "j", the position of each characteristic diagram of the first arrangement area D152 does not coincide with the position of any characteristic diagram D151 of the third arrangement area D154, regardless of the amount of shift. In addition, the relationship between the arrangement of the characteristic diagram D151 of the second arrangement area D153 and the arrangement of the characteristic diagram D151 of the fourth arrangement area D155 is similarly formed.

As shown in FIG. 8B, as the measurement pattern D15 projected from the first projector 21, the first projection measurement pattern T16 is displayed on the projection surface 9. The first projection measurement pattern T16 includes the projection characteristic diagram T161 corresponding to the characteristic diagram D151. Similarly, the second to fourth projection measurement patterns T17 to T19 are displayed by the second to fourth projectors 22 to 24. The second to fourth projection measurement patterns T17 to T19 respectively includes the projection characteristic diagrams T171, T181 and T191 corresponding to the characteristic diagram D151.

The first projection measurement pattern T16 is aligned with the second projection measurement pattern T17 in the horizontal direction. The display pixels aligned in the horizontal direction of the first and second projection measurement patterns T16 and T17 corresponding to the pixels, which are aligned in the direction of "i", of the measurement pattern D15. When the direction of "i" corresponding to the direction in which the first and second projection measurement patterns T16 and T17 are aligned is set to the first arrangement direction, and the direction of "j" is set to the second arrangement direction, the coordinates of each characteristic point of the first characteristic diagram column D156 in the second arrangement direction (the direction of "j") are different from the coordinates of any characteristic point of the second characteristic diagram column D157 in the direction of "j". Accordingly, the position of the projection characteristic diagram T161 in the vertical direction may be easily misaligned with the position of the projection characteristic diagram T171 in the vertical direction, and therefore overlapping between the projection characteristic diagrams T161 and T171 is avoided regardless of the amount of overlapping of the first and second projection measurement patterns T16 and T17 in the horizontal direction. The third projection measurement pattern T18 is aligned with the fourth projection measurement pattern T19 in the horizontal direction. Accordingly, owing to the similar reason, overlapping between the projection characteristic diagrams T181 and T191 is avoided regardless of the amount of overlapping of the third and fourth projection measurement patterns T18 and T19 in the horizontal direction.

The first projection measurement pattern T16 is aligned with the third projection measurement pattern P18 in the vertical direction. The display pixels aligned in the vertical direction of the first and third projection measurement patterns T16 and T18 corresponding to the pixels, which are aligned in the direction of "j", of the measurement pattern D15. When the direction of "j" corresponding to the direction in which the first and second projection measurement patterns T16 and T18 are aligned is set to the first arrangement direction, and the direction of "i" is set to the second arrangement direction, the coordinates of each characteristic point of the third characteristic diagram column D158 in the second arrangement direction (the direction of "i") are different from the coordinates of any characteristic point of the fourth characteristic diagram D159 in the direction of "i". Accordingly, the position of the projection characteristic diagram T151 in the horizontal direction may be easily misaligned with the position of the projection characteristic diagram T181 in the horizontal direction, and therefore overlapping between the projection characteristic diagrams T161 and T181 is avoided regardless of the amount of overlapping of the first and third projection measurement patterns T16 and T18 in the vertical direction. The second projection measurement pattern T17 is aligned with the fourth projection measurement pattern T19 in the vertical direction. Accordingly, owing to the similar reason, overlapping between the projection characteristic diagrams T171 and T191 is avoided regardless of the amount of overlapping of the second and fourth projection measurement patterns T17 and T19 in the horizontal direction.

As above, according to the second example of the measurement pattern, even in a case where the measurement patterns having the same arrangement of the characteristic diagram D151 are projected in parallel by a plurality of projectors 2, it can be avoided that the projection characteristic diagrams T161, T171, T181, and T191 overlap with one another on the projection surface 9. Accordingly, owing to reason similar to the above-described embodiment, the correction information representing the correspondence relationship between the position of the pixel on the projection surface and the position of the pixel that is defined in the image data can be efficiently acquired.

In addition, the measurement patterns having the same arrangement of the characteristic diagram D151 are used by the plurality of the projectors 2, the effort required for generating the measurement image data or the like can be lessened. In addition, since the measurement pattern projected by any projector has the same arrange of the characteristic diagrams, the characteristic point of any projection measurement pattern can be detected based on the same algorithm, and accordingly, the effort required for detecting the characteristic point can be lessened.

Figure 9:
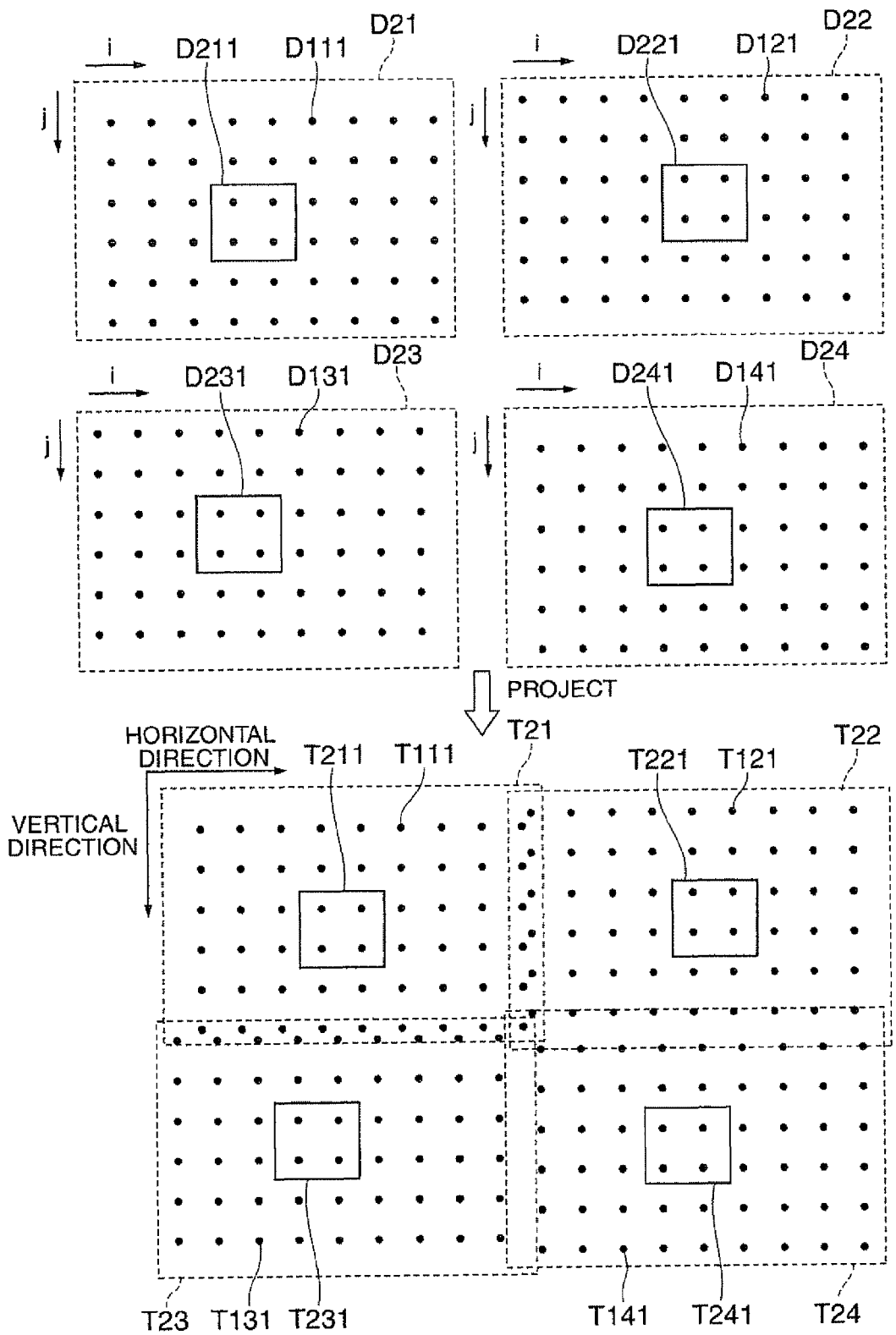
FIG. 9 is an explanatory diagram of a measurement pattern of a third example.

FIG. 9 is an explanatory diagram representing the measurement patterns of a third example.

As shown in FIG. 9, fifth to eighth measurement patterns D21 to D24 as the measurement patterns of the third example include the second characteristic diagram in addition to the characteristic diagram (hereinafter, referred to a first characteristic diagram) of the first example described in the embodiment as above.

More specifically, the fifth measurement pattern D21 includes the second characteristic diagram D211 in addition to the first characteristic diagram D111. The second characteristic diagram D211 has an area larger than that of the first characteristic diagram D111, and, for example, has a simple shape such as a rectangular shape or a circular shape. In this example, the second characteristic diagram D211 having an approximately rectangular shape is arrange on the center of the fifth measurement pattern D21 on the whole. Here, there is the positional relationship that the center position of the fifth measurement pattern 521 is included in the inside of the second characteristic diagram D211. Similarly, the sixth measurement pattern D22 includes the second characteristic diagram D221, the seventh measurement pattern D23 includes the second characteristic diagram 5231, and the eighth measurement pattern D24 includes the second characteristic diagram D241.

The fifth measurement pattern D21 is projected by the first projector 21 and is displayed on the projection surface 9 as the fifth projection measurement pattern T21. The fifth projection measurement pattern T21 includes the first projection characteristic diagram T111 corresponding to the first characteristic diagram D111 and the second projection characteristic diagram T211 corresponding to the second characteristic diagram D211. Similarly, the sixth to eighth measurement patterns D22 to D24 are projected by the second to fourth projectors 22 to 24 and are displayed on the projection surface 9 as the sixth to eighth projection measurement patterns T22 to T24. The sixth to eighth projection measurement patterns T22 to T24 include the second projection characteristic diagrams T221, T231, and T241.

In order to detect the first characteristic diagram from the photographed images acquired by photographing the fifth to eighth projection measurement patterns T 21 to T24, first, the second characteristic diagram is detected. Since the second characteristic diagram has an area larger than that of the first characteristic diagram and has a simple shape, the second characteristic diagram can be easily detected, for example, through half conversion or the like. The positions of the first and second characteristic diagrams occupying the measurement pattern are defined in the measurement image data and are known. Accordingly, when the position information of the detected second characteristic diagram is used, a rough position of the first characteristic diagram occupying the photographed projection pattern can be estimated. By using the rough position, the first characteristic diagram is detected by performing a search in a predetermined area, for example, located on the periphery of the rough position. Accordingly, the calculation load required for detection of the first characteristic diagram can be decreased, and whereby the correction information can be efficiently acquired. In addition, since the divided width of the area at the time of searching the first characteristic diagram can be formed to be small without increasing the calculation load, the number of failures in detecting the first characteristic diagram can be decreased. In addition, when the detection of the first characteristic diagram fails, for example, the estimated value of the rough position of the first characteristic diagram can be used as a result of detection, the robustness in the process can be improved.

The entire disclosure of Japanese Patent Application No. 2010-42463, filed Feb. 26, 2010 is expressly incorporated by reference herein.

What is claimed is:

1. A correction information calculating device that calculates correction information representing correspondence relationship between a position of a pixel in an image projected onto a projection surface by projectors including an image forming element and a position of a pixel of the image forming element, the correction information calculating device comprising:
    a supply unit that supplies first measurement image data representing a first measurement pattern including a plurality of characteristic diagrams that define characteristic points to a first projector that projects an image onto a first projection area on the projection surface and supplies second measurement image data representing a second measurement pattern including a plurality of characteristic diagrams that define characteristic points to a second projector that projects an image onto a second projection area including an overlapping area overlapping the first projection area; and
    a calculation unit that calculates the correction information by comparing positions of the plurality of characteristic points in a photographed pattern acquired by photographing the first and second measurement patterns projected onto a projection surface by the first and second projectors based on the first and second measurement image data and positions of the plurality of characteristic points defined in the first and second measurement image data,
    wherein, when an arrangement direction of pixels of the first and second measurement patterns corresponding to an alignment direction of the first projection area and the second projection area is set as a first arrangement direction, and a direction intersecting the first arrangement direction is set as a second arrangement direction, the first and second measurement patterns include characteristic diagram columns configured by two or more of the characteristic diagrams arranged on the end located on a side overlapping another measurement pattern in the first arrangement direction out of the plurality of characteristic diagrams, and
    wherein positions in the second arrangement direction of the characteristic diagrams belonging to the characteristic diagram column defined in the first measurement image data are different from positions in the second arrangement direction of the characteristic diagrams belonging to the characteristic diagram column defined in the second measurement image data,
    wherein positions of the characteristic points of the first measurement pattern are shifted as compared to positions of the characteristic points of the second measurement pattern, and
    wherein the first and the second measurement patterns are projected and photographed at a same time.

2. The correction information calculating device according to claim 1,
    wherein arrangement of the plurality of characteristic diagrams in the first measurement pattern is the same as arrangement of the plurality of characteristic diagrams in the second measurement pattern,
    wherein the measurement pattern includes a first characteristic diagram column arranged on one end in the first arrangement direction and a second characteristic diagram column arranged on the other end, and
    wherein positions of the characteristic diagrams belonging to the first characteristic diagram column in the second arrangement direction are different from positions of the characteristic diagrams belonging to the second characteristic diagram column in the second arrangement direction.

3. An image processing apparatus comprising:
    reaction information calculating device according to claim 1; and
    an image correction unit that corrects image data such that an image projected onto a projection surface by a projector based on the image data after correction approximately coincides with an image represented by the image data before correction by referring to the correction information calculated by the correction information calculating device.

4. An image display system comprising:
    the image processing apparatus according to claim 3; and
    a plurality of projectors that projects images based on the image data after correction that is corrected by the image processing apparatus.

5. The image display system according to claim 4, further comprising: a photographing device that photographs an area including the first projection area and the second projection area onto which the measurement pattern is projected,
    wherein the correction information calculating device calculates the correction information by using a photographed pattern out of photographed images photographed by the photographing device.

6. An image processing apparatus comprising:
    the correction information calculating device according to claim 2; and
    an image correction unit that corrects image data such that an image projected onto a projection surface by a projector based on the image data after correction approximately coincides with an image represented by the image data before correction by referring to the correction information calculated by the correction information calculating device.

7. An image display system comprising:
    the image processing apparatus according to claim 6; and
    a plurality of projectors that projects images based on the image data after correction that is corrected by the image processing apparatus.

8. The image display system according to claim 6, further comprising: a photographing device that photographs an area including the first projection area and the second projection area onto which the measurement pattern is projected,
    wherein the correction information calculating device calculates the correction information by using a photographed pattern out of photographed images photographed by the photographing device.

9. An image processing method comprising:
    supplying first measurement image data representing a first measurement pattern including a plurality of characteristic diagrams that define characteristic points to a first projector that projects an image onto a first projection area on a projection surface and supplies second measurement image data representing a second measurement pattern including a plurality of characteristic diagrams that define characteristic points to a second projector that projects an image onto a second projection area including an overlapping area overlapping the first projection area;

calculating correction information representing correspondence relationship between positions of the plurality of characteristic positions in an photographed pattern acquired by photographing the measurement pattern projected onto the projection surface by the projectors based on the measurement image data and positions of the plurality of characteristic points defined in the measurement image data; and correcting the image data such that an image projected onto the projection surface by the projectors based on the image data after correction approximately coincides with an image represented by the image data before correction by referring to the correction information, wherein, when an arrangement direction of pixels of the measurement patterns corresponding to an alignment direction of the first projection area and the second projection area is set as a first arrangement direction, and a direction intersecting the first arrangement direction is set as a second arrangement direction, the measurement patterns include characteristic diagram columns configured by two or more of the characteristic diagrams arranged on the end located on a side overlapping another measurement pattern in the first arrangement direction out of the plurality of characteristic diagrams, and wherein positions in the second arrangement direction of the characteristic diagrams belonging to the characteristic diagram column defined in the first measurement image data are different from positions in the second arrangement direction of the characteristic diagrams belonging to the characteristic diagram column defined in the second measurement image data, wherein positions of the characteristic points of the first measurement pattern are shifted as compared to positions of the characteristic points of the second measurement pattern, and wherein the first and the second measurement patterns are projected and photographed at a same time.

10. The correction information calculating device according to claim 1, wherein positions of the characteristic points of the first measurement pattern are shifted by half a pitch as compared to positions of the characteristic points of the second measurement pattern.

11. The correction information calculating device according to claim 1, wherein the characteristic points of the first measurement pattern are shifted by half a pitch in a first direction as compared to positions of the characteristic points of the second measurement pattern and the characteristic points of the first measurement pattern are shifted by half a pitch in a second direction substantially perpendicular to the first direction as compared to positions of the characteristic points of the second measurement pattern.

12. The image processing method according to claim 9, wherein positions of the characteristic points of the first measurement pattern are shifted by half a pitch as compared to positions of the characteristic points of the second measurement pattern.

13. The image processing method according to claim 9, wherein the characteristic points of the first measurement pattern are shifted by half a pitch in a first direction as compared to positions of the characteristic points of the second measurement pattern and the characteristic points of the first measurement pattern are shifted by half a pitch in a second direction substantially perpendicular to the first direction as compared to positions of the characteristic points of the second measurement pattern.

* * * * *